(12) United States Patent
Nakayama et al.

(10) Patent No.: US 8,446,061 B2
(45) Date of Patent: May 21, 2013

(54) ROTATING ELECTRIC MACHINE HAVING STATOR CORE WITH SLOT INSULATION ENCIRCLING FIRST AND SECOND COILS

(75) Inventors: Kenichi Nakayama, Hitachinaka (JP); Satoshi Yamamura, Naka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 493 days.

(21) Appl. No.: 12/709,064

(22) Filed: Feb. 19, 2010

(65) Prior Publication Data

US 2011/0204742 A1 Aug. 25, 2011

(51) Int. Cl.
*H02K 3/34* (2006.01)
(52) U.S. Cl.
USPC .......................................... 310/215; 310/214
(58) Field of Classification Search
USPC .................. 310/179, 180, 198, 201, 203, 208, 310/214, 215
IPC ...................................................... H02K 19/22
See application file for complete search history.

(56) References Cited

U.S. PATENT DOCUMENTS

| | | | | |
|---|---|---|---|---|
| 3,334,255 A | * | 8/1967 | Peters | 310/215 |
| 4,994,700 A | * | 2/1991 | Bansal et al. | 310/215 |
| 5,864,193 A | * | 1/1999 | Katoh | 310/214 |
| 6,124,660 A | * | 9/2000 | Umeda et al. | 310/215 |
| 6,741,004 B2 | * | 5/2004 | Senoo et al. | 310/215 |
| 6,900,572 B2 | * | 5/2005 | Omura | 310/215 |
| 6,972,506 B2 | * | 12/2005 | Onishi | 310/215 |
| 2002/0014806 A1 | * | 2/2002 | Senoo et al. | 310/215 |
| 2002/0130581 A1 | * | 9/2002 | Arai et al. | 310/215 |

FOREIGN PATENT DOCUMENTS

| | | | |
|---|---|---|---|
| JP | 52-37253 U | | 9/1950 |
| JP | 52-337253 | | 9/1950 |
| JP | 03155358 A | * | 7/1991 |
| JP | 4-210746 A | | 7/1992 |
| JP | 11-155270 | | 6/1999 |
| JP | 2002-136016 A | | 5/2002 |

OTHER PUBLICATIONS

Japanese Office Action with English Translation dated Mar. 13, 2012 (five (5) pages).

* cited by examiner

*Primary Examiner* — John K Kim
*Assistant Examiner* — Naishadh Desai
(74) *Attorney, Agent, or Firm* — Crowell & Moring LLP

(57) ABSTRACT

A rotating electric machine comprises a stator and a rotor. In the rotor, numerous slots are formed along a circumferential direction. In the each of slots, a first stator coil and a second stator coil are inserted and insulated by an insulator inserted before inserting the coils in the slots. The insulator encircles the first and second stator coils so as to be formed into an S shape. The center portion thereof extends over the area between the first and second stator coils. One end of the insulator is held between one surface of the center portion of the insulator and the first stator coil. Other end of the insulator is held between another surface of the center portion of the insulator and the second stator coil.

12 Claims, 17 Drawing Sheets

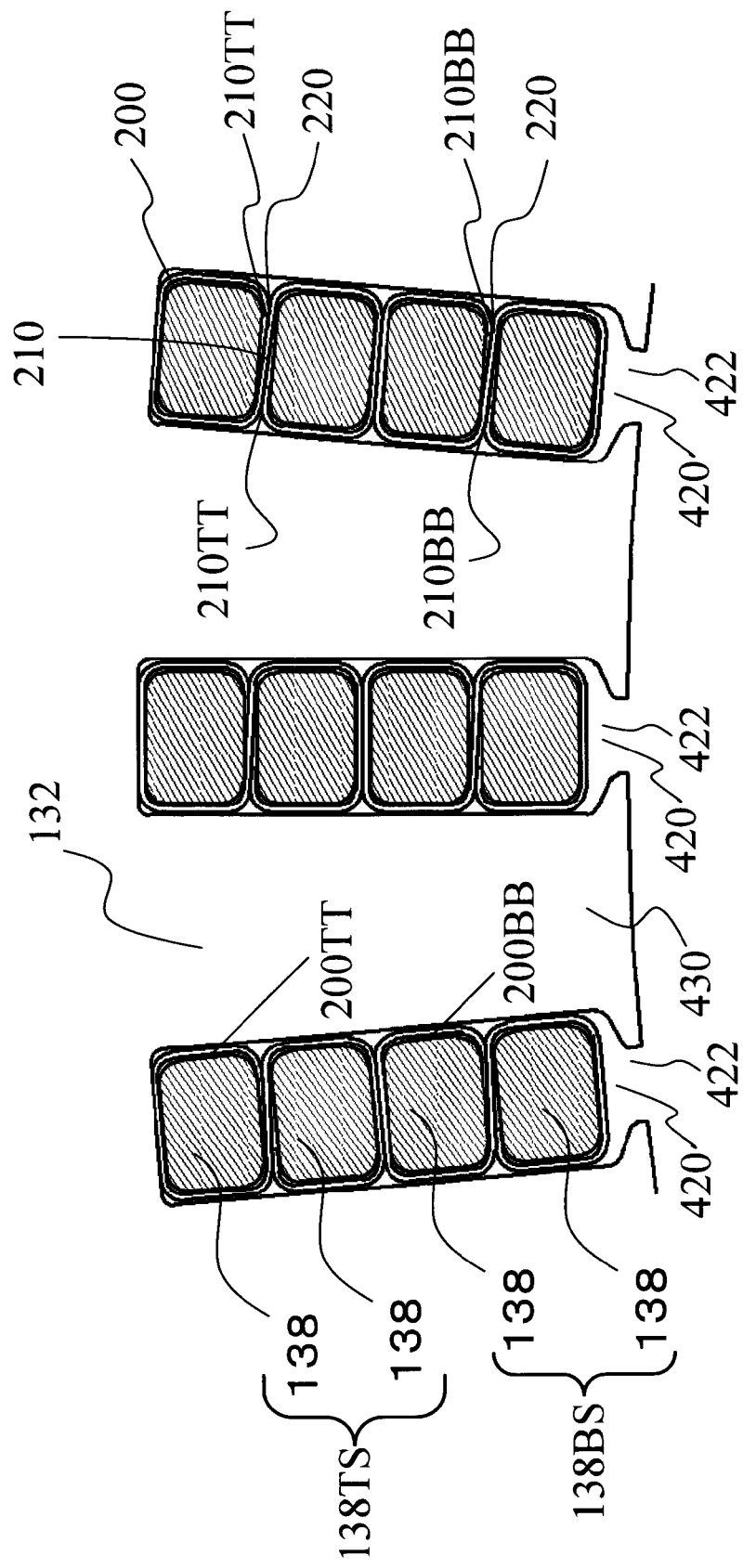

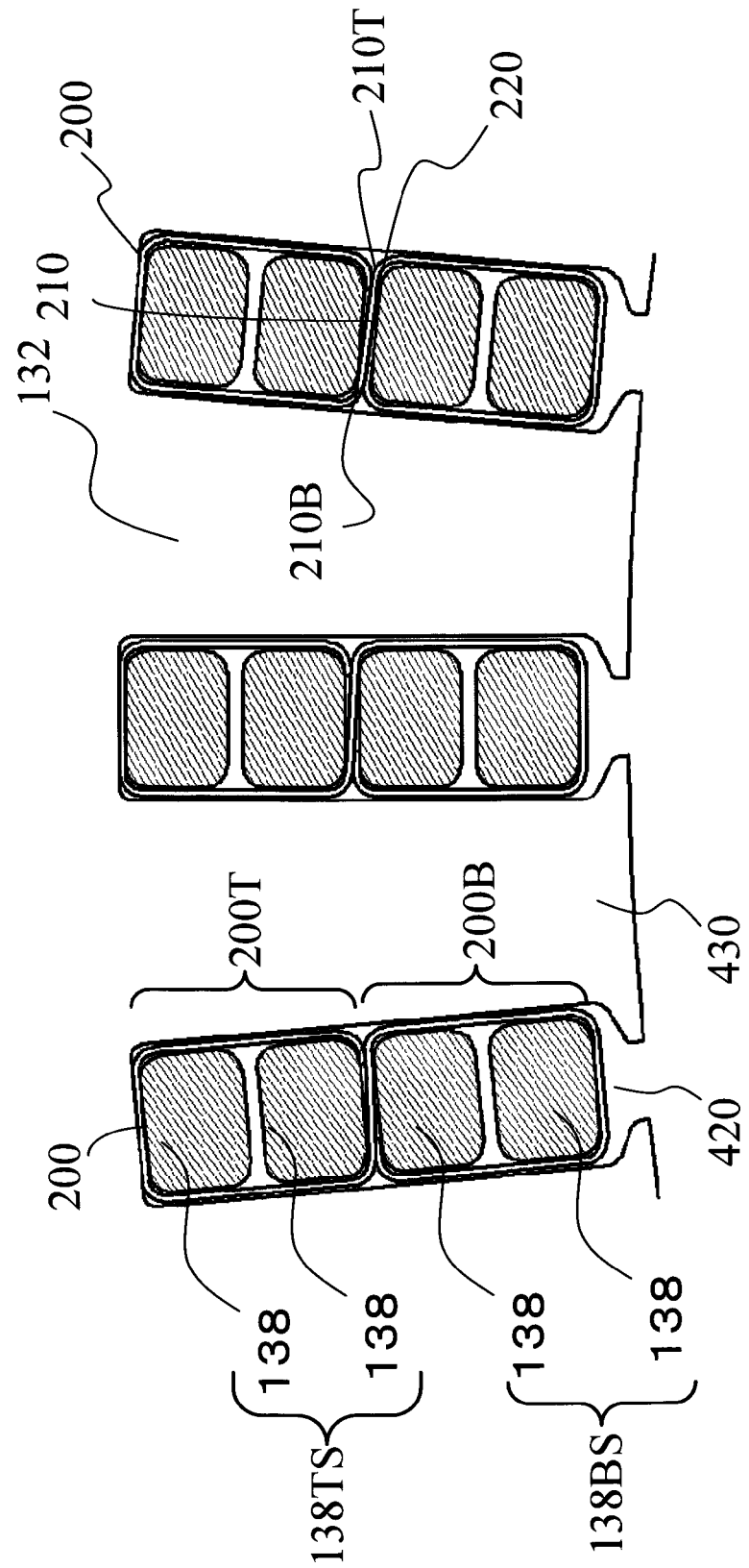

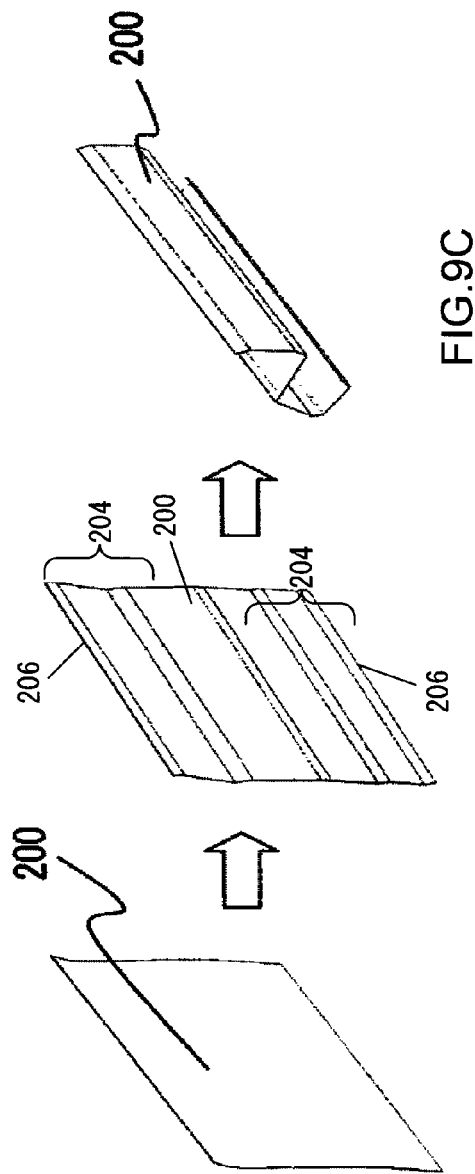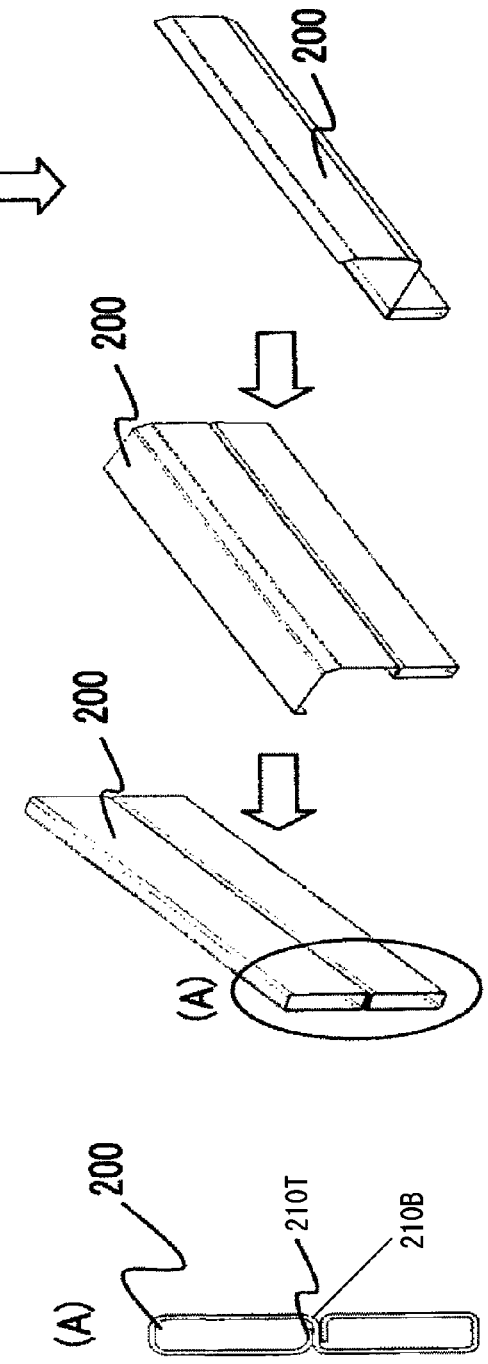

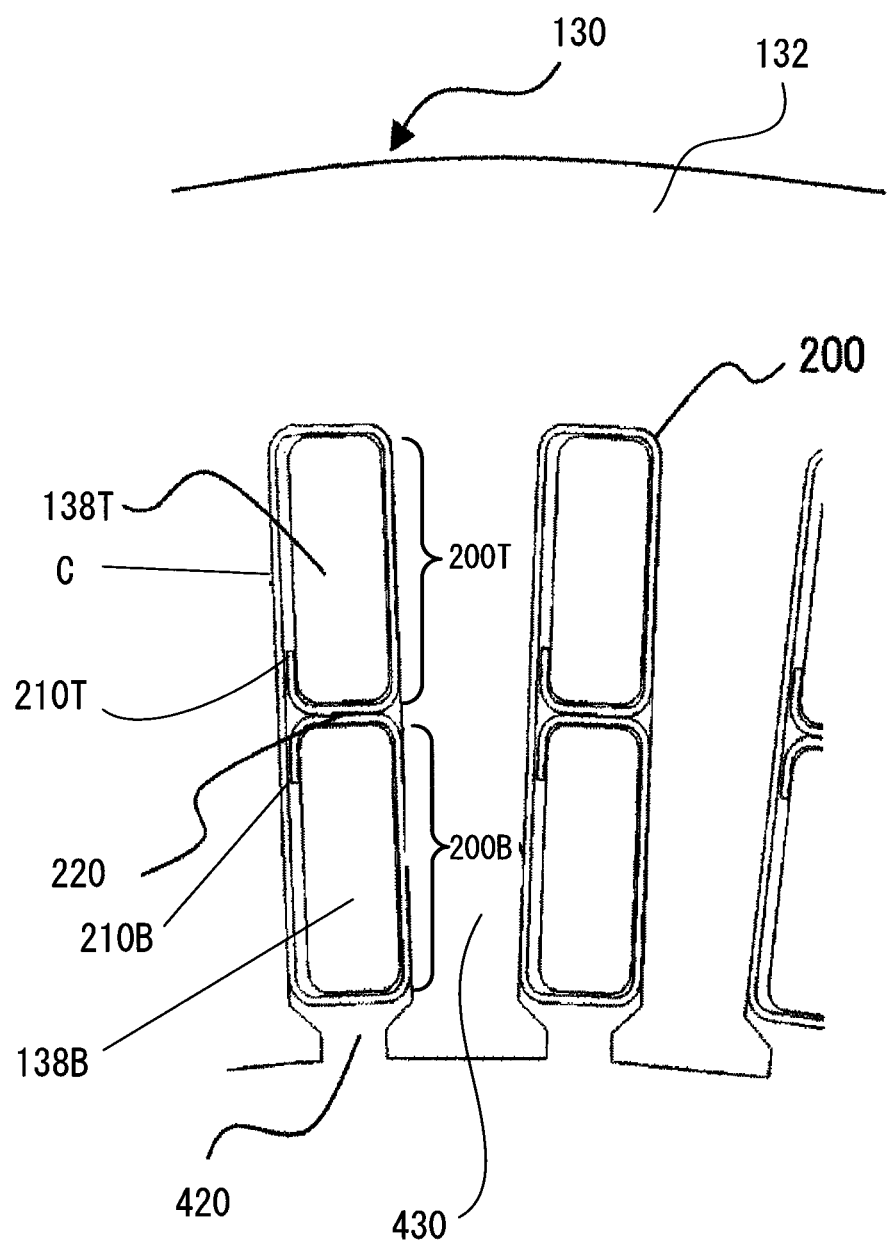

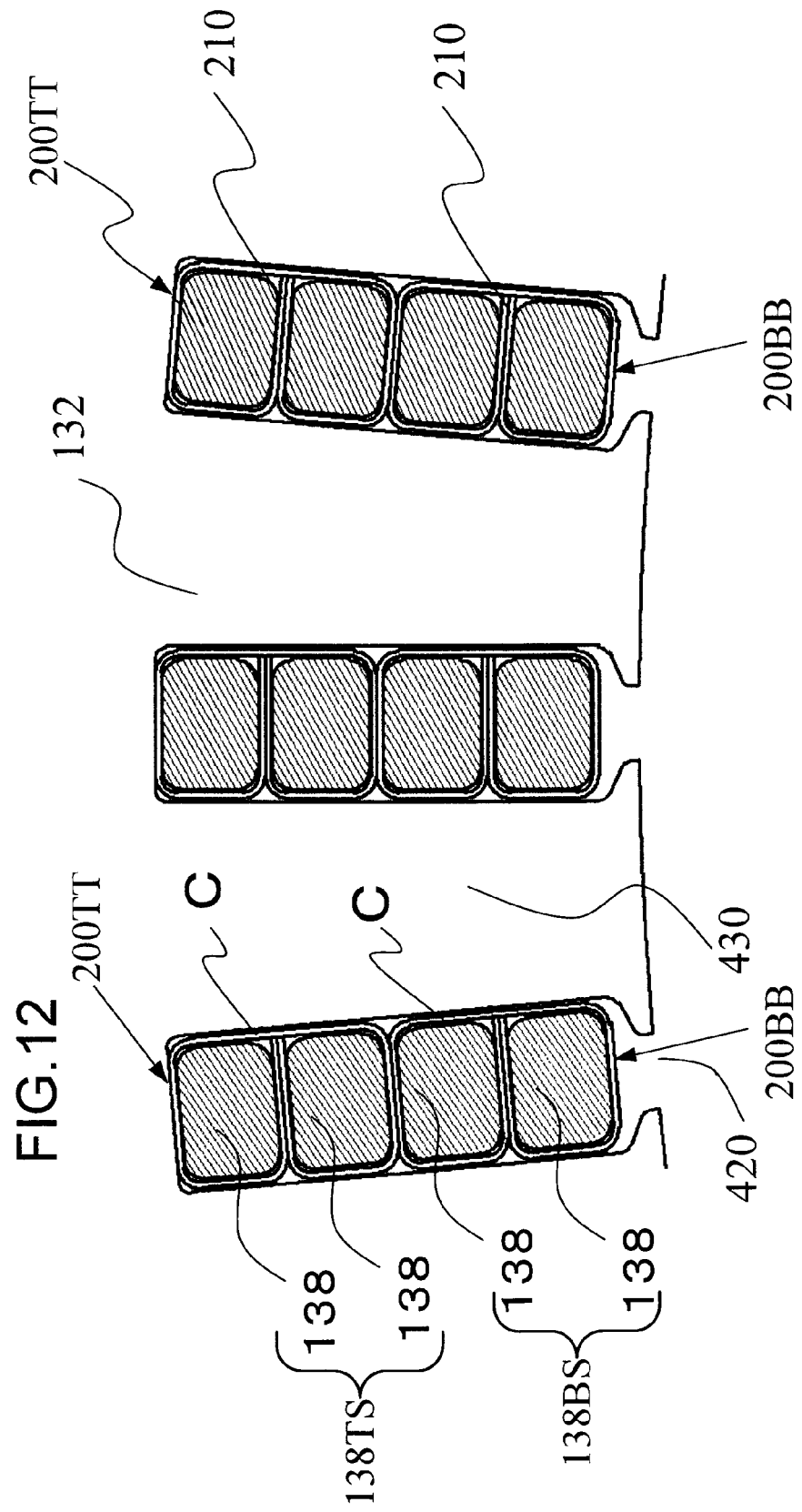

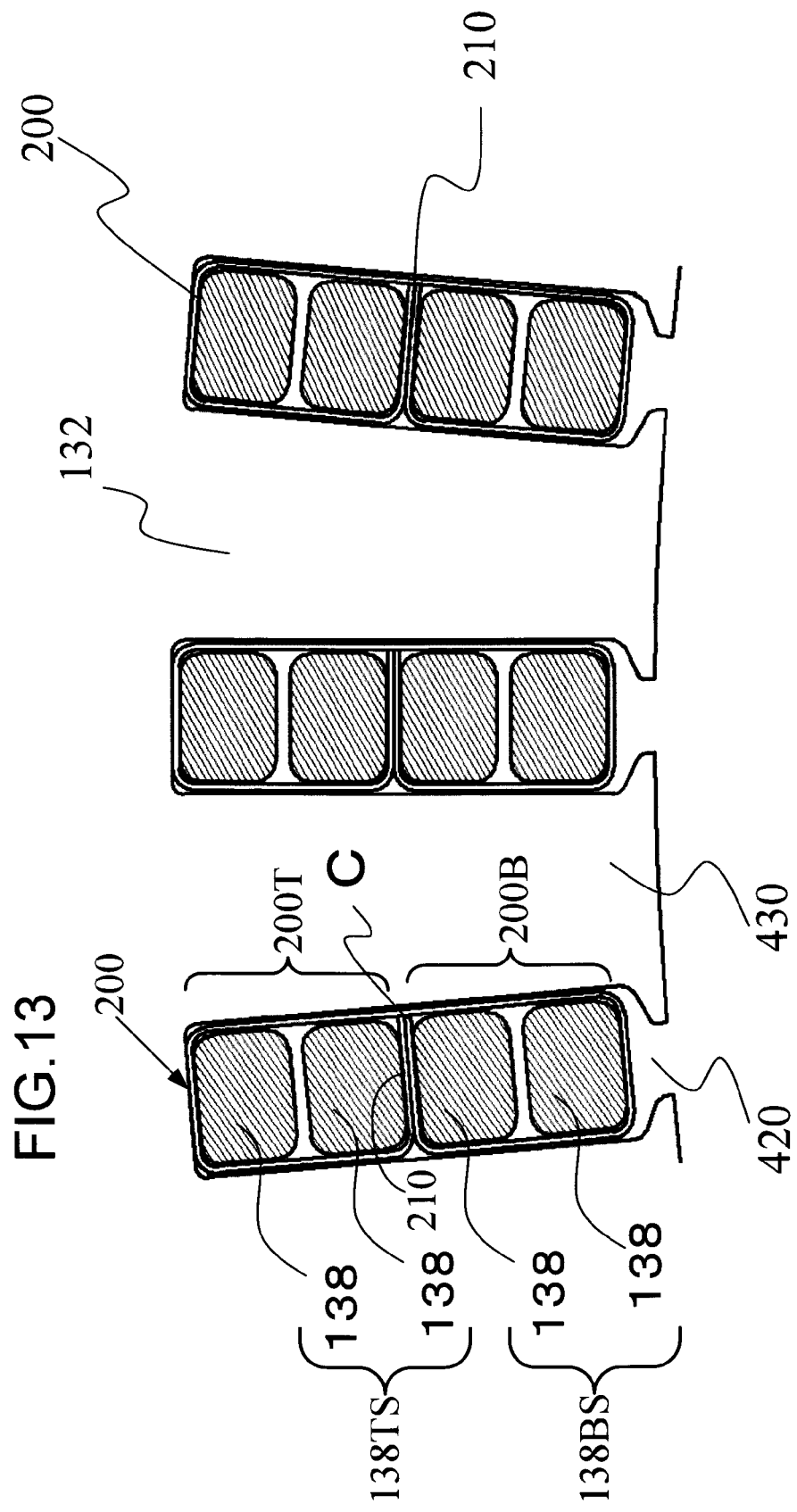

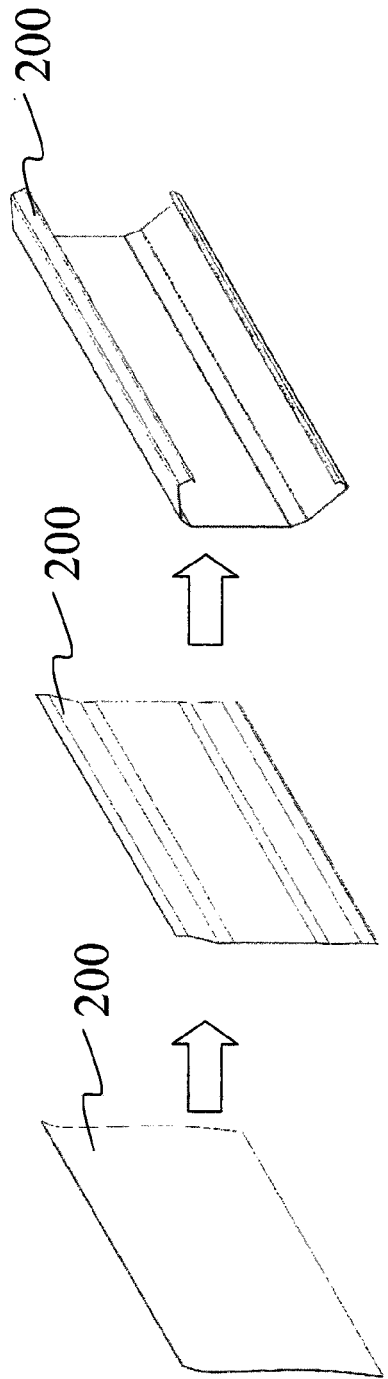
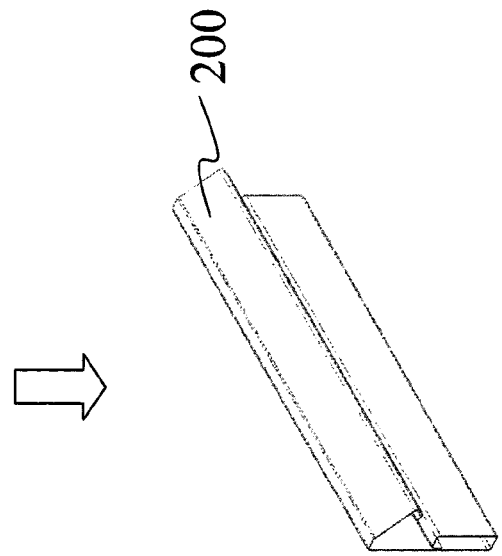
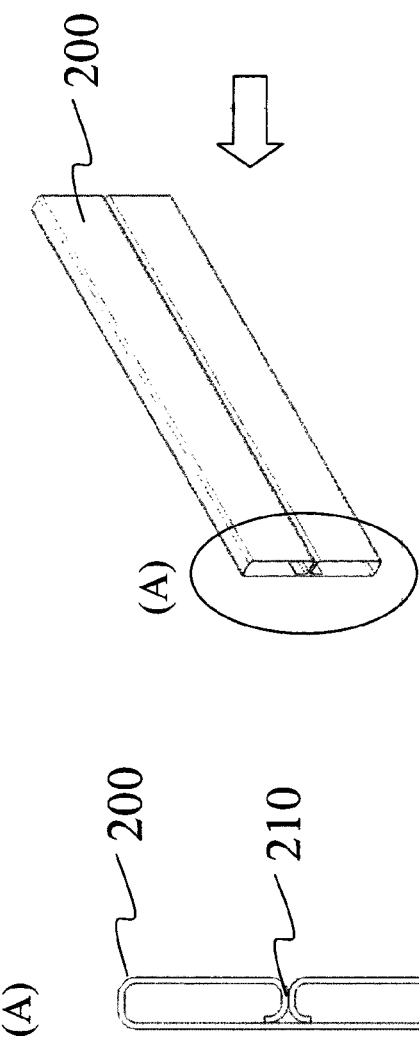
FIG.14A
FIG.14B
FIG.14C
FIG.14D
FIG.14E
FIG.14F

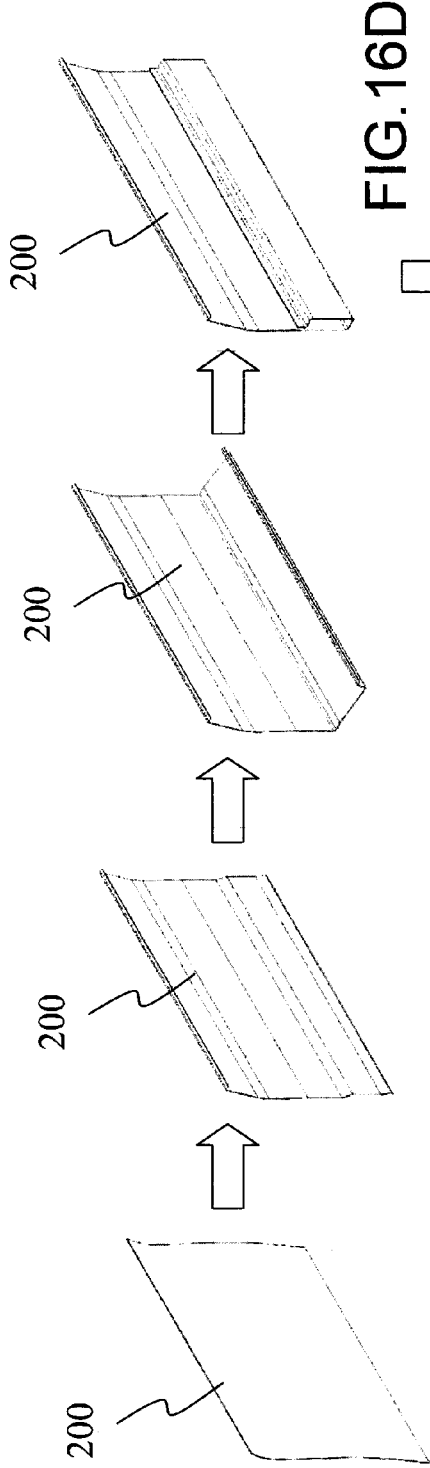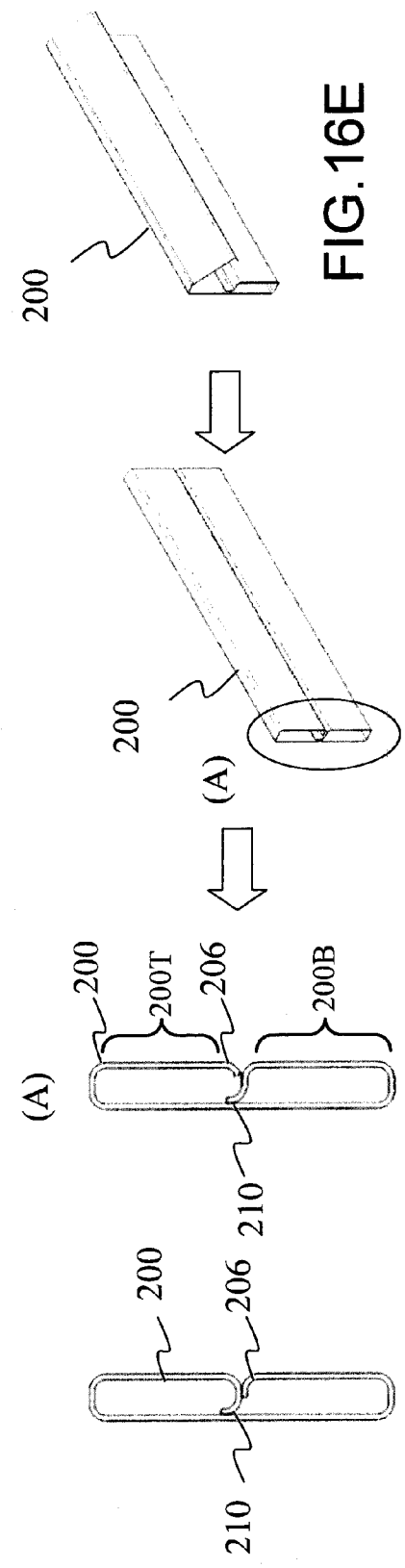

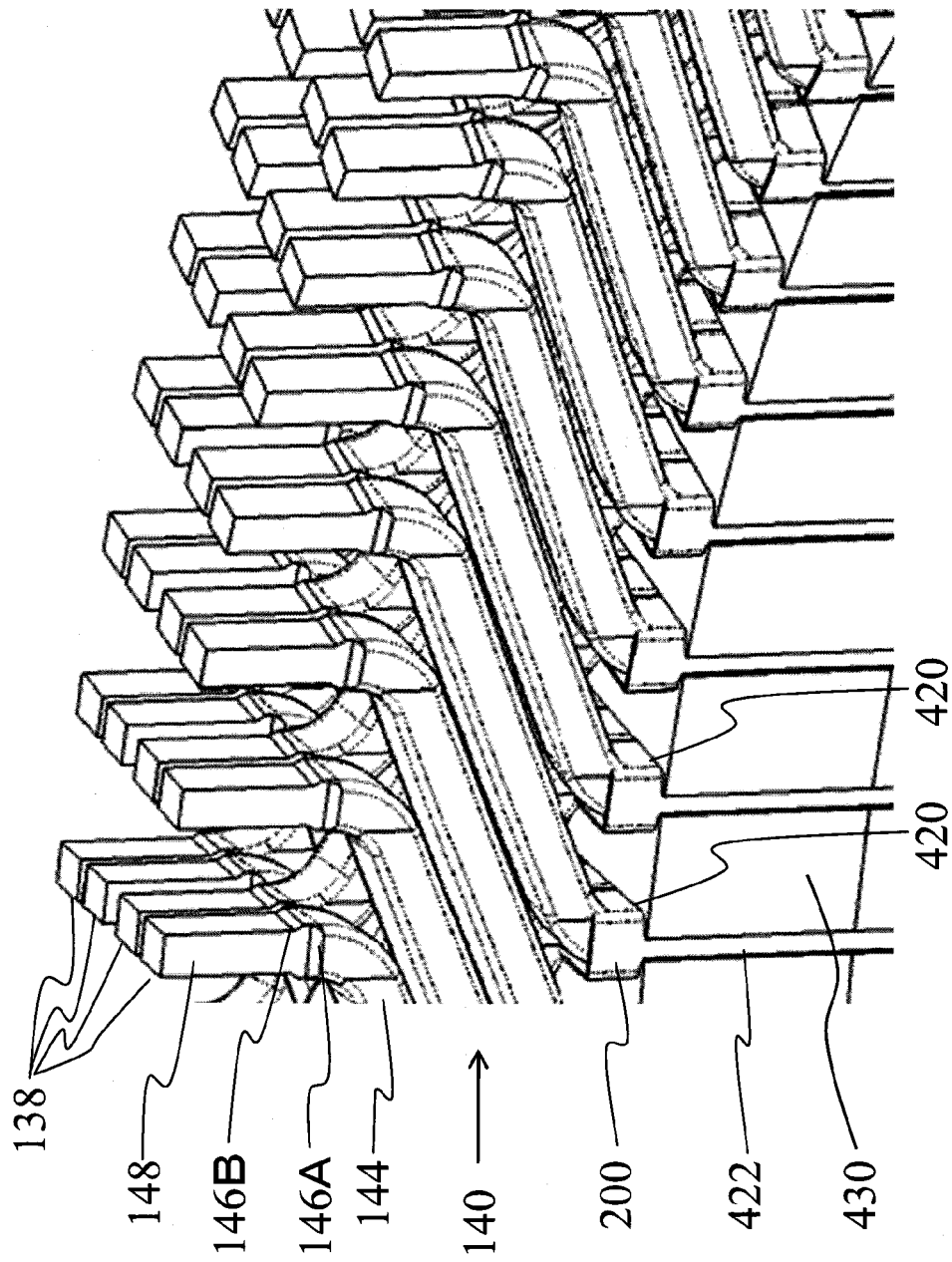

US 8,446,061 B2

ROTATING ELECTRIC MACHINE HAVING STATOR CORE WITH SLOT INSULATION ENCIRCLING FIRST AND SECOND COILS

INCORPORATION BY REFERENCE

The disclosure of the following application is herein incorporated by reference: Japanese Patent Application No. 2008-032532 filed Feb. 14, 2008.

BACKGROUND OF THE INVENTION

Field of the Invention

The present invention relates to a rotating electric machine and more specifically it relates to a rotating electric machine that generates torque in order to engage an automobile in traveling operation or generates power for braking the automobile.

A rotating electric machine is equipped with a stator and a rotor. The stator includes a stator core with numerous slots formed therein and a coil disposed within the numerous slots and wound through a distributed winding method. As AC power is supplied to the coil, a rotating magnetic field is generated at the stator and torque is generated at the rotor under the influence of the rotating magnetic field. In addition, the mechanical energy of the rotor is converted to electrical energy and AC power is output from the coil. In order to enable such a rotating electric machine to generate a relatively high level of torque and braking force, a plurality of coils are disposed side-by-side along the radial direction within each slot at the rotating electric machine and a thin insulator, in addition to an insulation means such as an insulating film coating the surfaces of the coils, is used to electrically insulate the individual coils from one another or to electrically insulate the coils from the rotor core in the known art.

The Japanese Laid-Open Patent Publication No. H11-155270 discloses an AC generator that generates low-voltage AC power with an engine torque, which is different from a rotating electric machine that generates torque used to engage a vehicle in traveling operation or a braking force to be applied to the vehicle. The AC generator disclosed in patent reference 1 includes two coils positioned side-by-side along the radial direction within the slots formed at the stator core of the stator and an insulator that insulates the coils from each other and also insulates each coil from the slot. The insulator assumes an S-shaped section over the plane perpendicular to the axis of the AC generator. The AC generator generates AC power used for a 14 V power source, and since the level of the voltage generated at the coils is low, the S-shaped insulator assures reliable insulation.

Unlike an on-vehicle AC generator, a rotating electric machine that may adopt the present invention operates on AC power at a voltage equal to or greater than 100 V and a sufficient level of insulation may not be achieved with the insulator installed with the S formation described above in such a rotating electric machine. In particular, a rotating electric machine engaged in generating torque to be used to engage an automobile in traveling operation and in regenerative braking to generates a braking force by converting automobile traveling energy to electrical energy, must be connected to a power conversion device that converts DC power to AC power and vice versa via a power semiconductor element engaged in switching operation and thus, the AC power generated therein tends to include spike noise occurring as a result of the switching operation at the power semiconductor element.

SUMMARY OF THE INVENTION

An object of the present invention is to provide a rotating electric machine equipped with a stator assuring outstanding insulation characteristics.

It is desirable that a rotating electric machine adopting the present invention assure reliable insulation so as to allow the rotating electric machine to fully withstand the AC power voltage.

In addition, the rotating electric machine adopting the present invention is likely to be connected to the power conversion device. Thus, it is desirable that it assure reliable insulation allowing it to withstand the voltage attributable to noise resulting from the switching operation at the power semiconductor element in the power conversion device, which may be added into the AC power.

In an aspect of the present invention providing a rotating electric machine comprising a stator that generates a rotating magnetic field and a rotor that generates torque based upon the rotating magnetic field, with numerous slots formed along a circumferential direction at the stator, a first stator coil and a second stator coil disposed adjacent to the first stator coil are set side-by-side along a radial direction in each of the slots, and an insulator, disposed at a holding area where it is held between the first stator coil and the second stator coil, encircles the first stator coil with the corresponding end of the insulator fixed at the holding area so as to be held between one surface of the insulator and the first stator coil and also encircles the second stator coil along a direction matching the direction in which the insulator portion encircling the first stator coil ranges, with the corresponding end of the insulator fixed at the holding area so as to be held between another surface of the insulator and the second stator coil.

In another aspect of the present invention providing a rotating electric machine comprising a stator that generates a rotating magnetic field and a rotor that generates torque based upon the rotating magnetic field, with numerous slots formed along a circumferential direction at the stator, a first stator coil and a second stator coil disposed adjacent to the first stator coil, are set side-by-side along a radial direction in each slot, and an insulator disposed at a bridging area over which the insulator bridges over surfaces of the first stator coil and the second stator coil located on one side, encircles the first stator coil with a corresponding end of the insulator fixed at the bridging area so as to be held between one surface of the insulator and the first stator coil and also encircles the second stator coil along a direction opposite the direction in which the insulator portion encircling the first stator coil ranges, with a corresponding end of the insulator fixed at the bridging area so as to be held between the one surface of the insulator and the second stator coil.

In yet another aspect of the present invention, the insulator disposed at the bridging area so as to bridge over the surfaces of the first stator coil and the second stator coil at one side encircles the first stator coil, is held at a holding area located between the first stator coil and the second stator coil, a corresponding end thereof extends to range between one surface of the insulator and the second stator coil before the end is fixed at the bridging area so as to be held between the insulator and the second stator coil, the insulator also encircles the second stator coil along the direction opposite from the direction in which the insulator portion encircles the first stator coil and a corresponding end thereof is fixed at the holding area so as to be held between the surface of the insulator and the second stator coil.

In yet another aspect of the present invention, the rotating electric machine adopts a structure that includes the insulator formed in a wavy shape and the stator coils inserted at holes formed with the wavy insulator. This structure allows the outer circumferences of the stator coils to be reliably shielded with the insulator, thereby assuring electrical insulation between the stator coils and the stator core.

The present invention provides a rotating electric machine that includes an insulator ideal for reliably insulating stator coils.

In addition, the present invention characterized by numerous features to be described in more specific terms in reference to the following embodiments, achieves numerous further advantages.

BRIEF DESCRIPTION OF THE DRAWINGS

FIG. 7 shows a structure that allows four or more stator coils to be disposed side-by-side along the radial direction in each slot 420.

FIG. 8 shows a structure achieved by slightly modifying the structure shown in FIG. 7

FIGS. 9A-9G are explanatory views of manufacturing steps through which the insulator 200 is manufactured.

FIG. 11 is an explanatory view of another embodiment achieved as a variation of the structure shown in FIG. 5.

FIG. 12 is an explanatory view of another embodiment achieved as a variation of the structure shown in FIG. 11.

FIG. 13 is an explanatory view of yet another embodiment achieved as a variation of the structure shown in FIG. 11.

FIGS. 14A-14F are explanatory views of manufacturing steps through which the insulators 200 to be used in the structures shown in FIGS. 11~13 are manufactured.

FIGS. 16A-16H are explanatory views of manufacturing steps through which the insulator 200 to be used in the structure shown in FIG. 15 is manufactured.

FIG. 18 shows a partial enlargement of the coil end 140 with stator coils 138 inserted in the slots 420.

DETAILED DESCRIPTION OF PREFERRED EMBODIMENTS

In reference to drawings, the rotating electric machine achieved in an embodiment of the present invention is described. The rotating electric machine described below enables an automobile to engage in traveling operation. The following explanation focuses on an example in which the present invention is adopted in a rotating electric machine in a hybrid-type vehicle. However it should be borne in mind that the term "electric car" is used to refer to a hybrid-type electric car equipped with both an internal combustion engine and a rotating electric machine or a pure electric car with no engine, which travels on a rotating electric machine alone, and that the rotating electric machine described below can be used in conjunction with both types of vehicles. The rotating electric machine for a hybrid-type vehicle achieved in the embodiment fulfills a function as a motor whereby it generates torque based upon electrical energy and a function as a dynamo electric generator whereby power is generated based upon mechanical energy and either function is selectively engaged in correspondence to the traveling condition of the automobile.

Figure 1:
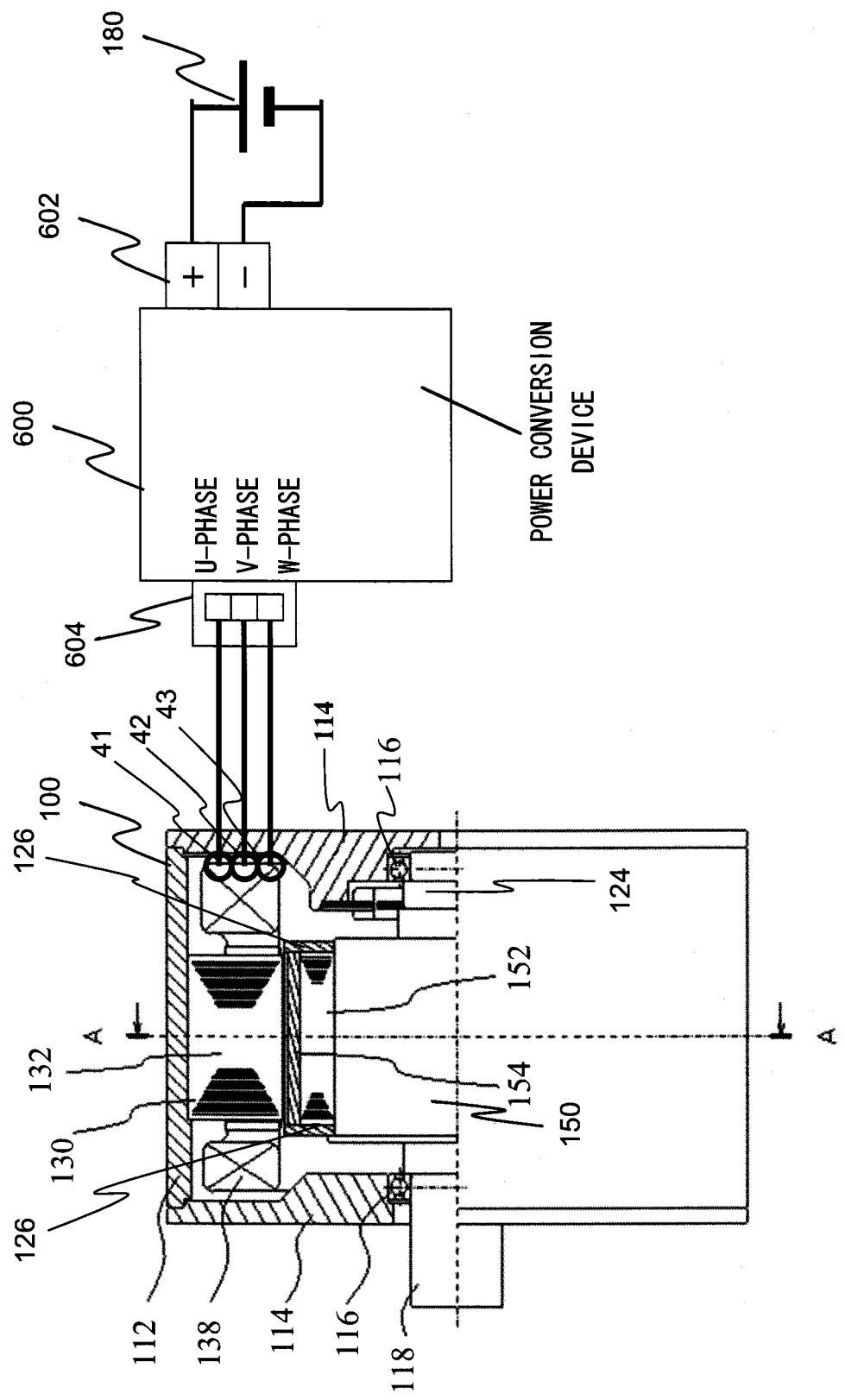
FIG. 1 shows a system diagram of a drive system for a rotating electric machine adopting the present invention.
Figure 2:
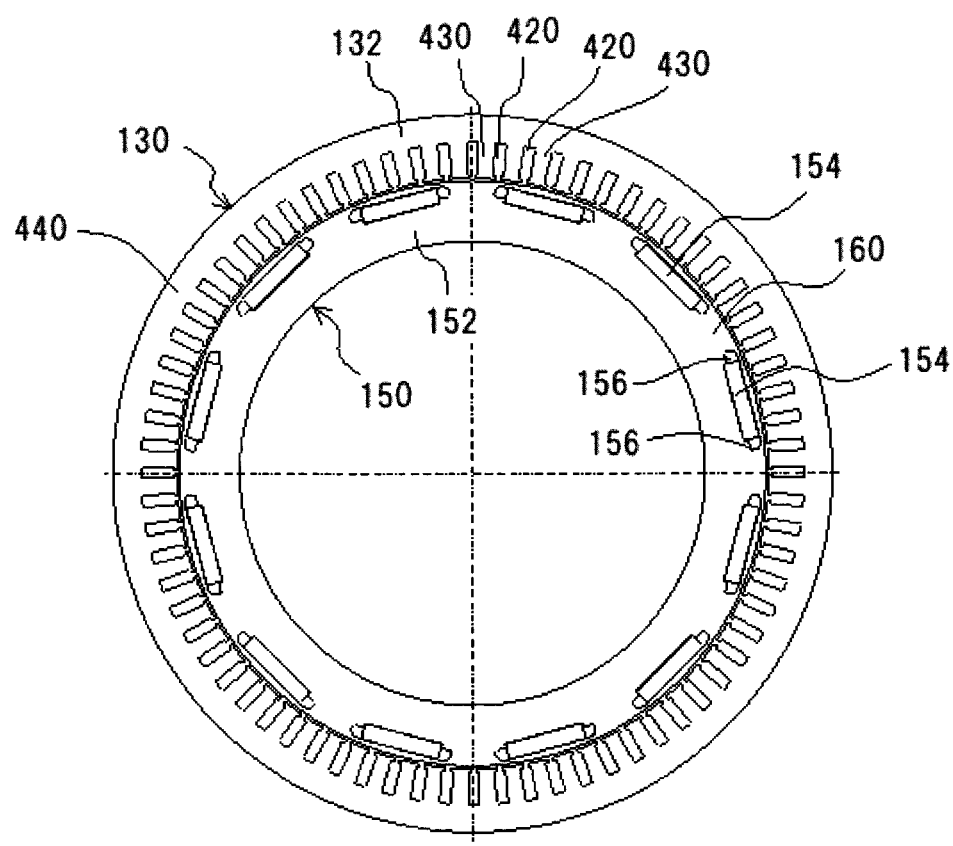
FIG. 2 shows a sectional view of the rotating electric machine taken along A-A in FIG. 1.
Figure 3:
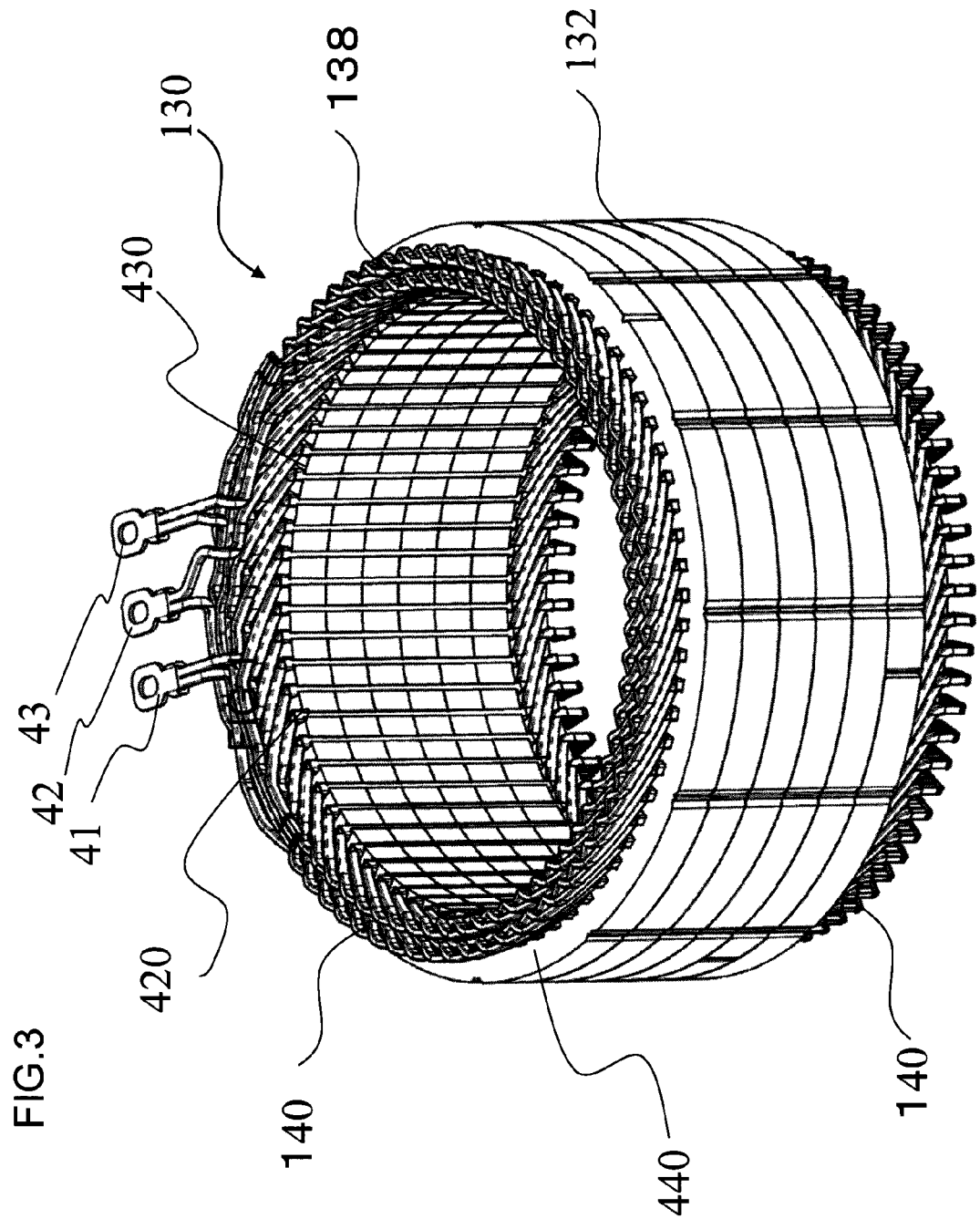
FIG. 3 shows a perspective of the stator in the rotating electric machine shown in FIG. 1.

FIG. 1 shows the drive system of the rotating electric machine used to enable a vehicle to travel, achieved in an embodiment of the present invention. FIG. 1 presents a sectional view taken through part of the rotating electric machine so as to provide a clear illustration of the internal structure of the rotating electric machine. FIG. 2 is a sectional view of the rotating electric machine in FIG. 1, taken through A-A. FIG. 3 is a perspective of the stator shown in FIGS. 1 and 2.

A rotating electric machine 100 comprises a stator 130 that includes a stator core 132 and stator coils 138 and a rotor 150 rotatably held via a void inside the stator core 132, both housed inside a housing 112. The rotor 150 includes a rotor core 152, permanent magnets 154 held at magnet insertion holes formed in the rotor core 152 and nonmagnetic contact plates 126. The rotor 150 is locked onto a shaft 118. The housing 112 includes a pair of end brackets 114 in correspondence to each of which a bearing 116 is disposed, and the shaft 118 is rotatably held via the bearings 116.

A resolver 124 via which the position of a magnetic pole of the rotor 150 and the rotating speed of the rotor 150 is detected is disposed at the shaft 118, and the output of the resolver 124 is taken into a control circuit (not shown) installed within a power conversion device. Based upon the signal taken in, the control circuit engages a switching element in a built-in power module (not shown) at the power conversion device 600 so as to convert DC power supplied from a high-voltage battery 180 to the power module via a DC terminal 602 to three-phase AC power. The three-phase AC power is then supplied from an AC terminal 604 of the power conversion device 600 to the stator coils 138 via AC terminals 41, 42 and 43 at the stator coils 138 and a rotating magnetic field is generated with the AC power thus supplied. Torque is then generated at the rotor 150 with the rotating magnetic field. In order to generate the rotating magnetic field needed to generate the required torque, the control device (not shown) mentioned above calculates a control value for the power module based upon the detection value provided from the resolver 124 and the switching element in the power module (not shown) is engaged in switching operation based upon the control value calculated by the control device so as to generate AC power assuming a current value, a frequency and a phase that are needed for generating the torque.

FIG. 2 shows the stator 130 in the rotor 150 in a sectional view taken through A-A in FIG. 1 showing the rotating electric machine 100. It is to be noted, however, that for purposes of simplification, the illustration does not include the housing 112, the shaft 118 and the stator coil and the insulator disposed inside each slot 420. The stator core 132 includes a core back 440 located on the outer circumferential side thereof and numerous slots 420 and teeth 430 evenly disposed over the entire inner circumference. Each tooth 430 is formed between two successive slots 420 to guide the rotating magnetic field generated by the stator coils 138 to the rotor 150 and torque is generated at the rotor 150. It is to be noted that reference numerals are attached to only some of the slots and the teeth in the figure, instead of appending reference numerals to all the slots and teeth.

At the rotor core 152, magnet insertion holes at which rectangular magnets are inserted are formed over equal intervals with a permanent magnet 154 embedded and fixed via glue or the like in each magnet insertion hole. The width of the magnet insertion holes measured along the circumferential direction is set greater than the width of the permanent magnets 154 measured along the circumferential direction. Magnetic voids 156 are formed on the two sides of each permanent magnet 154. Glue may be poured into the magnetic voids 156 or they may be fixed together with the permanent magnet 154 by using resin mold method. The permanent magnet 154 fulfills a function of forming a field pole at the rotor 150. While each field pole is formed with a single permanent magnet in the structure achieved in the embodiment, a plurality of magnets may be used to form a magnetic pole and by increasing the number of permanent magnets, the magnetic flux density at each magnetic pole formed with permanent magnets is increased, to result in a greater magnet-induced torque.

The permanent magnets 154 are magnetized along the radial direction with the direction of the magnetization reversed every field pole. Namely, assuming that the surface facing toward the stator and the surface on the axis side are respectably magnetized to N polarity and S polarity at a permanent magnet 154 used to form a given magnetic pole, the surface facing the stator and the axis-side surface of the permanent magnet 154 to form an adjacent magnetic pole are respectably magnetized to assume S polarity and N polarity. These permanent magnets 154 are disposed along the circumferential direction and magnetized so that the magnetization direction switches in correspondence to the individual magnetic poles. In the embodiment, 12 permanent magnets 154 are disposed over equal intervals and thus, 12 magnetic poles are formed at the rotor 150.

The permanent magnets 154 may be magnetized first and then embedded in the magnet insertion holes at the rotor core 152, or the permanent magnets may be first inserted in the magnet insertion holes at the rotor core 152 and then be magnetized by applying a powerful magnetic field to them. Once magnetized, the permanent magnets 154 impart a strong magnetic force. Thus, if the permanent magnets 154 are magnetized before they are fixed into the rotor 150, the strong attraction between the magnets and the rotor core 152 hinders the process of fixing the permanent magnets to the rotor. In addition, particles such as iron dust may settle onto the permanent magnets 154 due to the strong magnetic force. Accordingly, it is more desirable to magnetize the permanent magnets 154 after they are inserted at the magnet insertion holes at the rotor core 152 in order to assure better rotating electric machine productivity. The permanent magnets 154 may be sintered magnets constituted of a neodymium material or a samarium material, ferrite magnets or bonded magnets constituted of a neodymium material. It is desirable that the permanent magnets 154 assure a residual magnetic flux density of approximately 0.4~1.3 T and for this reason, a neodymium material is considered to be optimal.

An auxiliary magnetic pole 160 is formed between a permanent magnet 154 that forms a specific magnetic pole and the next permanent magnet 154 so as to reduce the magnetic resistance of a q-axis magnetic flux generated at the stator coil 138 in the embodiment. With the auxiliary magnetic pole 160, the magnetic resistance of the q-axis magnetic flux is reduced significantly compared to the magnetic resistance of a d-axis magnetic flux, resulting in a large reluctance torque. As the three-phase AC current is supplied to the stator coil 138 and a rotating magnetic field is generated at the stator 130, the action of the rotating magnetic field on the permanent magnets 154 at the rotor 150 generates a magnet torque. In addition to the magnet torque, the reluctance torque is also generated at the rotor 150 and thus, the magnet torque and the reluctance torque working together provide a large torque at the rotor.

In the embodiment, the stator coils 138 are wound through a distributed winding method and are connected by assuming a star connection configuration. In the distributed winding method, a phase winding is wound on the stator core 132 so that the phase winding is housed within two slots 420 set apart from each other over a plurality of slots 420. Since the stator coils are wound by adopting the distributed winding method, the waveform of the distribution of the magnetic flux formed via the stator coils is closer to that of the sine wave compared to the waveform of the magnetic flux distribution observed in conjunction with coils wound through a concentrated winding method, and thus, a reluctance torque can be generated more readily. As a result, weak fields can be controlled and the reluctance torque can be utilized with better control accuracy and with such a rotating electric machine that can be utilized over a wide rotating speed range, i.e., at high rotating speed as well as at low rotating speed, outstanding motor characteristics optimal for electric vehicles and the like can be achieved.

FIG. 3 is a perspective of the stator 130. In FIGS. 2 and 3, the stator 130 includes the stator core 132 with the slots 420 formed along the circumferential direction over equal intervals and the stator coils 138 inserted and held at the slots 420. In the embodiment, 72 slots are formed and the stator core 132 at which the slots 420 are formed is constituted with a laminated steel plate formed by shaping electromagnetic steel plates with a thickness of approximately 0.05~1 mm through punching or etching and then by layering the electromagnetic steel plates having been shaped. The slots 420 are arranged in a radial pattern over equal intervals from one another along the circumferential direction, as described earlier, and they are each elongated along the circumferential direction. Teeth 430 are formed, each between two successive slots 420. The individual teeth 430 are formed as an integrated part of the ring-shaped core back 440. In other words, the teeth 430 and the core back 440 are formed as an integrated unit. The slots 420 each include an opening located on the inner circumferential side and this opening constitutes a slot opening 422 at each slot 420. The width of the opening, measured along the circumferential direction, is substantially equal to or slightly smaller than the width of the coil installation area of each slot where the coil is installed.

Next, the stator coils 138 are described. The stator coils in the embodiment are phase coils assuming a three-phase star connection configuration. While the stator coil may have a round section or a substantially rectangular section, a substantially rectangular section is desirable since an improvement in efficiency, e.g. packing factor within the slots 420, scan be achieved with coils having a substantially rectangular section. The stator coils 138 are each constituted with a conductor, the exterior of which is shielded with an insulating coating. A higher level of insulation reliability is assured by insulating the stator coil with both an insulator 200 to be described below and the insulating film. Better efficiency is assured in the rotating electric machine with the stator coil having a substantially rectangular section as described above. The rectangular shape assumed for the stator coil section may be a rectangle with the shorter sides thereof extending along the circumference of the stator core 132 and the longer sides thereof extending along the radial direction or a rectangle with the longer sides thereof extending along the circumferential direction and the shorter sides thereof extending along the radial direction.

A jumper wire is present on an outer side, e.g. on the upper side in the figure or on the lower side of another coil end, a coil end 140, which is made up with a portion of each coil extending further outward along the axial direction beyond the stator core. Thus, a neat and compact overall configuration is achieved, which, in turn, allows the entire rotating electric machine to be provided as a compact unit. The rotating electric machine used to drive a vehicle is engaged in operation at an increasingly higher voltage in recent years. It is more often engaged in operation at 100 V or higher. As DC power/AC power conversion is executed through switching at the power conversion device, a surge voltage occurs at the power conversion device. Under these circumstances, the stator coils 138 may be subject to a voltage of 400 V or 600 V or even higher. For this reason, it is crucial to assure improved reliability with regard to the insulation of the stator coils via the insulating coating and the insulator mentioned earlier. It is desirable from the viewpoint of assuring improved reliability to keep the individual coil ends in a neat and orderly arrangement. The AC terminals 41, 42 and 43, through which the three-phase AC power is supplied, project further outward along the axial direction relative to the coil end 140 and thus, the rotating electric machine can be assembled with better ease.

FIG. 3 shows the stator coils 138 each constituted with a conductor, the exterior of which is shielded with an insulating film. While a certain level of electrical insulation is achieved with the insulating coating, it is desirable to assure even better insulation reliability with an additional insulating means, i.e., the insulator 200, to sustain the withstand voltage at a high level. For instance, even if the insulating film becomes damaged or degraded, the presence of the insulator 200 disposed as described below sustains the required level of withstand voltage. The insulator 200, with which a higher the withstand voltage can be maintained so as to assure reliable insulation between individual stator coils 138 installed within the slot 420 and between the stator coils 138 and the inner surface of the slot 420 may be installed through any of the methods to be described below.

The insulator may be an insulating sheet constituted of, for instance, a heat resistant polyamide paper assuming a thickness of, for instance, 01~0.5 mm. It is crucial to ensure that even if the insulator 200 becomes slightly misaligned during the, process of manufacturing the stator 130 or after the manufacturing process, seamless presence of insulator is maintained between the stator coils 138 and the inner surface of the slot 420. This can be achieved by ensuring that the leading end of the insulator 200 or the trailing end of the insulator 200 overlap with another part of the insulator 200 with great reliability at a section perpendicular to the rotational axis of the rotor 150. It is clear that seamless presence of insulation may be achieved by allowing the leading end and the trailing end of the insulator 200 to overlap each other.

-S-Shaped Insulator-

Figure 4:
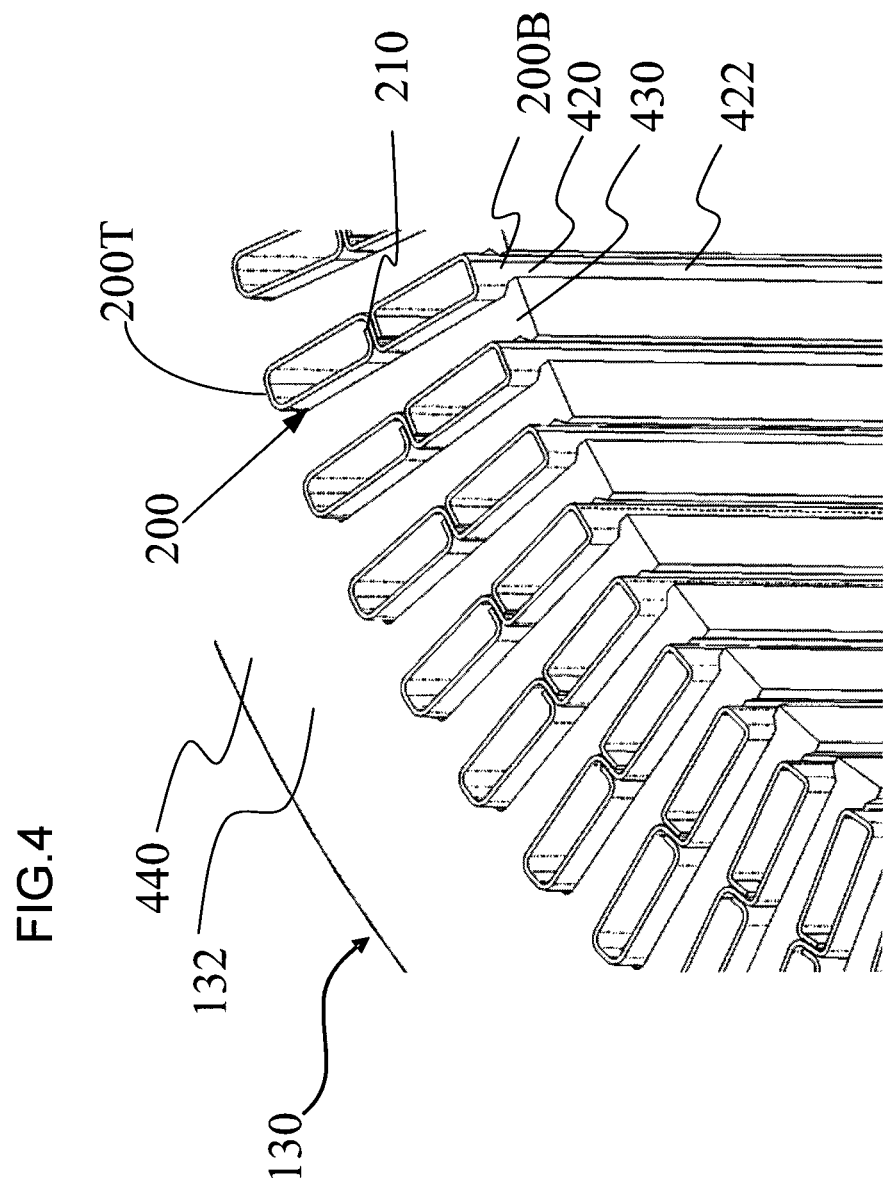
FIG. 4 is an explanatory view of the stator 130 with an insulator 200 inserted in each slot 420.
Figure 5:
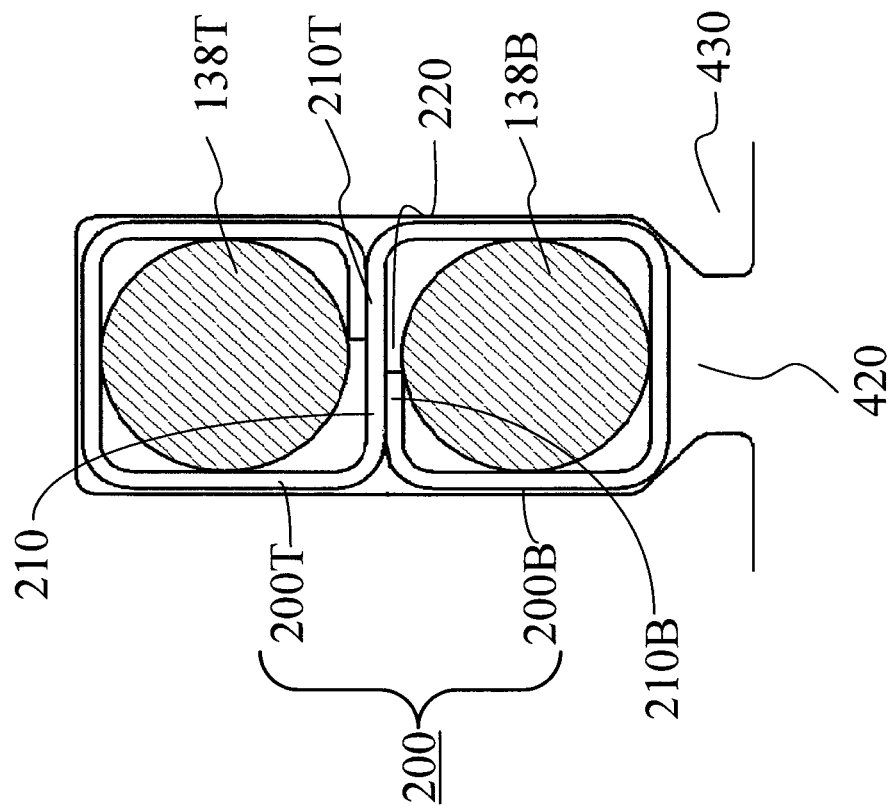
FIG. 5 is an explanatory view of a slot with an insulator 200 and stator coils 138 placed therein.
Figure 6:
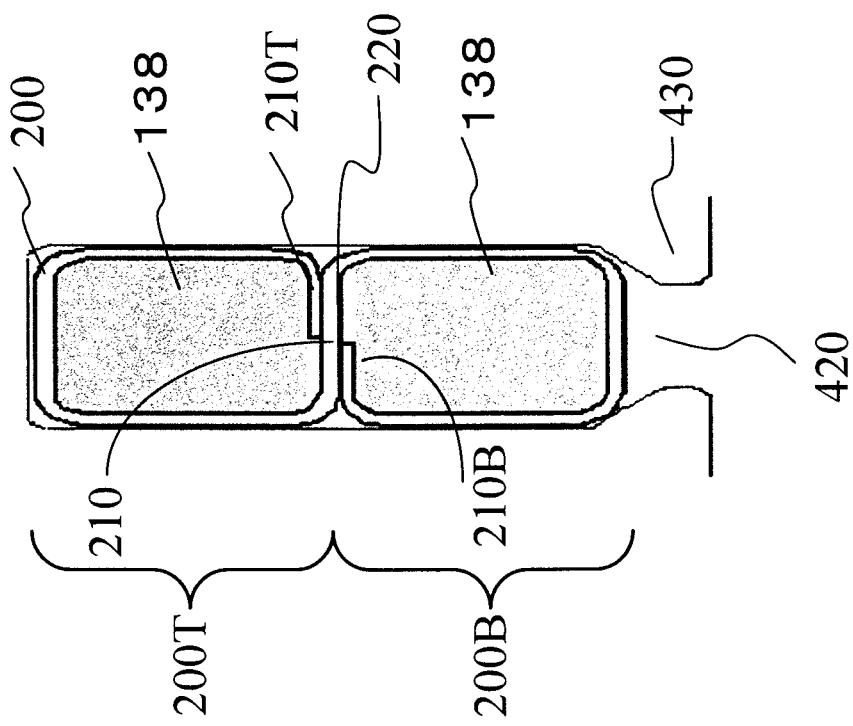
FIG. 6 is an explanatory view of another structure that may be adopted in the slot 420.

FIGS. 4, 5 and 6 are explanatory views illustrating one of the several structures of the insulator mentioned above. FIG. 4 is an enlarged perspective of part of the stator 130 in FIG. 3, with the stator coils 138 yet to be inserted at the slots 420. FIGS. 5 and 6 each present a sectional view of a slot 420 taken over a plane perpendicular to the rotational axis of the rotor 150. FIG. 5 shows conductors having a substantially rectangular section inserted in the space defined with the insulator 200 disposed inside the slot 420 such as those shown in FIG. 4. FIG. 6 shows conductors with a substantially circular section inserted in the space defined with the insulator 200 disposed inside the slot 420 such as those shown in FIG. 4. It is to be noted that the conductors constitute the stator coils 138.

The features (I) (II) and (III) characterizing the structure of the insulator 200 which is installed as shown in FIGS. 4, 5 and 6 will be described as follows.

(I) By installing the insulator 200 as shown in FIGS. 4, 5 and 6, the center portion 210 of the insulator 200 extends over an area 220 defined between the two stator coils 138, so that the withstand voltage between the two stator coils 138 can be sustained at a high level.

The insulator 200 comprises an inner side portion 200B and an outer side portion 200T is configured as shown in FIGS. 4, 5 AND 6. The inner side portion 200B of the insulator 200 starts from the center portion 210 of the insulator 200 and circles around the outer circumference of the stator coil 138 located on the bottom side in the figures. The end of inner side portion 200B reaches the center area 220 between the two stator coils 138. Whereas the outer side insulator portion 200T of the insulator 200 starts from the center portion 210 and circles around the outer circumference of the other stator coil 138 located on the top side in the figures. The end of outer side portion 200T reaches the center area 220 between the two stator coils 138. With the configuration of the insulator 200 noted above, the insulator 200 forms an S shape as viewed in FIGS. 5 and 6.

It is to be noted that while the insulator 200 assumes an inverted S formation when the section is viewed from the opposite direction, the technical concept remains the same. This structure assumed with regard to the insulator installation and the advantages achieved thereby constitute an essential feature of the embodiment.

(II) Another feature of the structure of the insulator 200 installed as shown in FIGS. 4, 5 and 6 will be explained. As shown in FIGS. 5 and 6, the inner side portion 200B covers the outer circumference of the inner side coil 138 and forms an overlapping portion 210B at the end thereof, which overlaps the center portion 210 of the insulator 200. Whereas the outer side portion 200T covers the outer circumference of the inner side coil 138 and forms an overlapping portion 210T at the end thereof, which overlaps the center portion 210 of the insulator 200.

According to the structure of the insulator 200, following advantage can be realized. It is assured that the insulator 200 can be present between the stator coils 138 and the slot 420 even if the insulator 200 is subjected to a force as a stator coil 138 is inserted at the slot 420. Namely, since there is no area where the insulator 200 is absent and thus only the insulating film separates the conductor constituting a stator coil 138 from the stator core 132, a high level of withstand voltage can be sustained. In addition, since the insulator 200 is always present between the stator coils 138, a high level of withstand voltage is also assured for the stator coils 138.

(III) Yet another feature of the installation structure of the insulator 200 as shown in FIGS. 4, 5 and 6 will be explained as follows. The ends of the insulator 200 or the ends of the inner and outer side portions 200B and 200T of the insulator 200 are positioned so as to be held between the stator coils 138 located on the bottom side and the top side of the figures. According to the structure of the insulator 200, the insulator 200 is prevented from becoming displaced after the stator coils 138 are inserted and thus, a high level of withstand voltage is assured.

-Variation for S-Shaped Insulator-

FIGS. 7 and 8 each present an example of a variation of the insulator adopted in conjunction with stator coils 138 having a rectangular section, as shown in FIG. 5. Each variation includes a greater number of stator coils 138 inserted in each slot. While the quantity of stator coils formed as shown in FIG. 6 may also be increased as a variation of the method, the basic structures of such variations will be substantially identical to those shown in FIGS. 7 and 8 except for the sectional area of the coils 138. Accordingly, a separate explanation regarding FIG. 6 is not provided.

Through an increase in the quantity of stator coils, a more intense rotating magnetic field can be generated via the stator 130. The structures shown in FIGS. 7 and 8 thus each include a greater quantity of stator coils 138 disposed side-by-side along the radial direction inside each slot 420. FIG. 7 shows a structure that includes two sets of stator coils disposed side-by-side along the radial direction, with each set of stator coils replicating the structure explained in reference to FIG. 5. Namely a pair of insulators 200BB and 200TT each enclosing the set of stator coils 138 are inserted within each slot 420. FIG. 8, on the other hand, shows a structure with the stator coils 138 described in reference to FIG. 5 each constituted with two conductors. Namely a single insulator 200 enclosing four stator coils 138 are inserted within each slot 420.

The basic structural concept of the variation is similar to that described in reference to FIG. 5. Even if a high-voltage is generated between the individual stator coils 138 in the structure shown in FIG. 7, each stator coil 138 is separated from the next stator coil via the insulator 200 and thus, a high level of withstand voltage is assured. This structure provides desirable surge voltage withstanding performance for an automotive rotating electric machine in which a high level of surge voltage tends to occur readily as the power conversion device is engaged in switching operation.

The structure shown in FIG. 8 is ideal when the variance in the voltages at stator coils 138 assuming a specific relationship is already known to be small. Namely, under such circumstances, a satisfactory level of insulation between the stator coils 138 assuming the specific relationship can be achieved with the insulating films at the individual stator coils 138. Accordingly, the stator coils 138 having the small voltage difference relative to each other are integrated as a set of stator coils 138TS and 138BS enclosed by the same insulator 200.

the concept of the present invention is then adopted in conjunction with this set of stator coils 138TS and another set of stator coils 138BS, between which a significant difference in the potential exists. This variation is more advantageous than that shown in FIG. 7 in that it ensures better productivity. For instance, when a plurality of coil sets having coils 138 assuming the same phase are present in a slot 420 at which four or more stator coils 138 are inserted, the stator coils 138 assuming the same phase or each coil set may be integrated into a set and the integrated set of stator coils may be inserted in the common void formed with the insulator 200.

The features (I) (II) and (III) characterizing the structure of the insulator 200 installed as shown in FIGS. 7 and 8 are substantially identical to the features described earlier with regard to FIG. 5. The features of the installation structure of FIGS. 7 and 8 will be described separately as follows.

(I) In the rotating electric machine as shown in FIG. 7, a pair of insulators 200BB and 200TT are inserted in a single slot 420 and each insulator encloses sets of a pair of coils 138BS and 138TS. The insulator 200BB is located at the inner side and the insulator 200TT is located at the outer side in FIG. 7. Respective insulators 200BB and 200TT correspond to the insulator 200 as shown in FIG. 5. In respective insulators 200BB and 200TT, the center portions thereof are positioned between the pair of coils 138. The insulators 200BB and 200TT encircle the outer circumference of the four coils 138 respectively so as to form an S shape respectively as viewed in FIG. 7.

By installing the insulator 200BB and 200TT as shown in FIG. 7, each of the center portions of the insulator 200TT and 200BB extends over an area 220 defined between the two stator coils 138, so that the withstand voltage betweens the two stator coils 138 can be sustained at a high level.

In the rotating electric machine as shown in FIG. 8, a single insulator 200 is inserted in a single slot 420 and the insulator 200 encloses two sets of coils 138TS and 138BS. The single insulator 200 comprises an inner side portion 200B and an outer side portion 200T. The inner side portion 200B and the outer side portion 200T extend from the center portion thereof and circle around the outer circumferences of the inner side coil group 138BS and the outer side coil group 138TS respectively. The center portion of the insulator 200 is arranged between the coil groups 138BS and 138TS. The insulator 200 form an S shape as viewed in FIG. 8.

By installing the insulator 200 as shown in FIG. 8, the insulator 200 circles the outer circumference of the coils 138 so as to form an S shape as viewed FIG. 8 and the center portion of the insulator 200 extends over an area 220 defined between the coil group 138BS and 138TS. As a result, the withstand voltage between the sets of two stator coils 138BS and 138TS can be sustained at a high level.

it is to be noted that while the insulator assumes an inverted S formation when the section is viewed from the opposite direction, the technical concept remains the same.

(II) In FIG. 7, the ends of the inner insulator 200BB form an overlapping portion 210BB respectively. The overlapping portions 210BB overlap the center portion 210 of the insulator 200 as noted above with regard to FIG. 5. In FIG. 8, the end of the inner side portion insulator 200B of the insulator 200 forms an overlapping portion 210B that overlaps the center portion 210 of the insulator 200, whereas the end of the outer side portion 200T of the insulator 200 forms an overlapping portion 210T that overlaps the center portion 2S10 of the insulator 200.

According to the feature of FIG. 7, it is assured that the insulators 200TT and 200BB can be present between the stator coils 138 even if the insulators 200 TT and 200BB are subjected to a force as stator coils 138 are inserted at the insulator 200TT and 200BB within the slot 420. Namely, since there is no area where the insulator is absent and thus only the insulating film separates the conductor constituting a stator coil 138T and 138B from the stator core 132, a high level of withstand voltage can be sustained. In addition, since the insulator is always present between the stator coils 138T and 138B, a high level of withstand voltage is also assured for the stator coils 138T and 138B.

The advantage of embodiment as shown in FIG. 8 is similar to that of FIGS. 5 and 7 and the explanation therefore is omitted, because the overlapping portions 210B and 210T are present between the pair of coils 138.

(III)In FIG. 7, the ends of insulators 200BB and the ends of insulator 200TT are positioned so as to be held between the pair of coils 138 respectively. In FIG. 8, the ends of insulators 200 are positioned so as to be held between the pair of coil group 138BS and 138TS respectively. According to this feature, the insulator 200BB, 200TT and 200 are prevented from becoming displaced after the stator coils 138 are inserted and thus, a high level of withstand voltage is assured.

In addition, in each of the structures illustrated in FIGS. 4~8, no overlapping portion 210B and 210T faces the slot opening 422 at the slot 420. By installing the insulator with no overlapping portion 210B and 210T set to face the slot opening 422 but instead all the overlapping portions 210B and 210T held between two stator coils 138, any shifting of the insulator 200, 200BB and 200TT at the ends thereof can be prevented and thus, a high level of withstand voltage can be sustained.

-Manufacturing Method for S-Shaped Insulator-

FIGS. 9A-9G illustrate the manufacturing steps through which the insulator 200, to be inserted with a substantially S formation at the slot 420 as described in reference to FIGS. 4 through 8, is manufactured. As explained earlier, when the insulator is inserted at the slot 420, overlapping portions 210B and 210T are formed. FIG. 9A shows the base material used to form the insulator 200 to be inserted at each slot 420. FIG. 9B shows the base material with folding lines, along which the material is to be folded to form the insulator 200. A portion that will separate the two stator coils 138 from each other is present at a center portion 202 of the insulator 200. Portions 204 to envelop the outer circumference of the stator coil 138 located on one side and the stator coil 138 located on the other side are present on the one side and the other side of the insulator 200. Ends 206 on the one side and the other side of the insulator 200 form the overlapping portions 210B and 210T when folded. The base material is folded as indicated in FIGS. 9C, 9D and 9E and as a result, the insulator 200 folded into the shape shown in FIG. 9F is created. FIG. 9G shows an enlargement of portion A in FIG. 9F. Reference numerals 210A and 210B denote the overlapping portions formed on the two sides.

The folded insulator 200, formed as illustrated in FIGS. 9A-9G, is inserted at each slot 420 in the stator 130. Since the length of the insulator 200 measured along the rotational axis is greater than the length of the stator core 132 measured along the rotational axis, the insulator 200 inserted at each slot 420 projects out beyond the end of the stator core 132 along the axial direction as shown in FIG. 4. After the insulator 200 is inserted at each slot 420 in the stator 130, the stator coils 138 are inserted into the voids created by the insulators 200 inside the slots 420. The section of the conductors constituting the stator coils 138 inserted in the slots may be either substantially rectangular or substantially circular, as illustrated in FIGS. 5 and 6.

-Variation of Folding Method for S-Shaped Insulator-

Figure 10A:
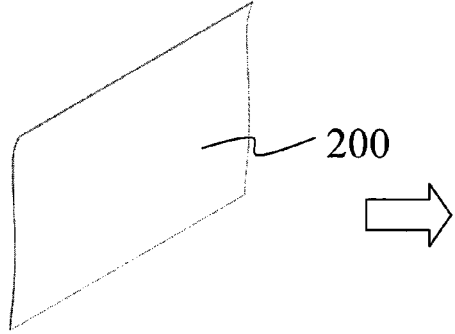
FIGS. 10A-10D are explanatory views of a manufacturing process achieved by slightly modifying the process shown in FIGS. 9A-9G.
Figure 10B:
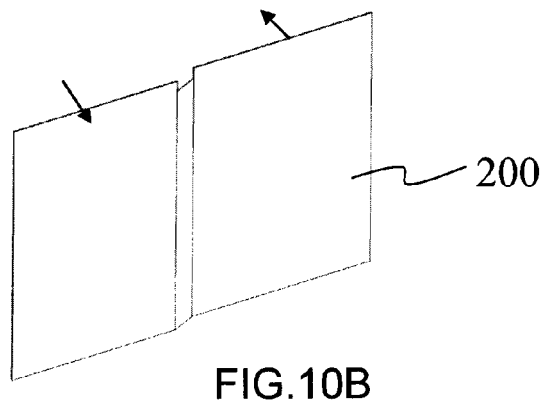
Figure 10D:
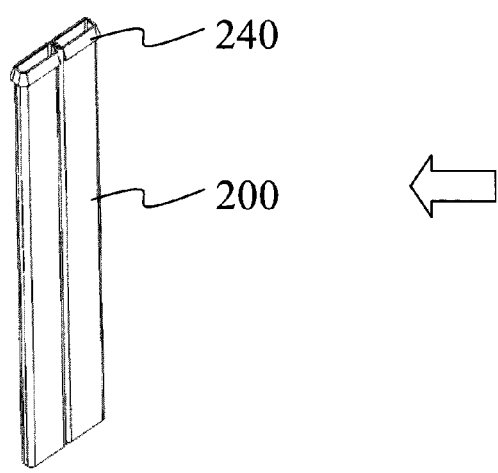
Figure 10C:
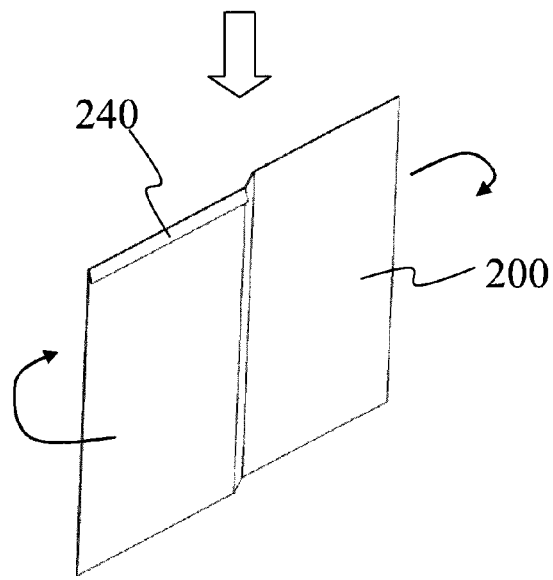

The insulator 200 shown in FIGS. 10A~10D, presenting an example of a variation of the folding method illustrated in FIGS. 9A-9G is folded based upon a concept basically identical to the method in FIGS. 9A-9G. The feature distinguishing the insulator shown in FIGS. 10A-10D is a folded portion 240 folded over 2~3 mm at least at one side of the opening of the insulator 200 along the axial direction, i.e., at least on the upper side in FIGS. 10A-10D, as shown in FIG. 10D.

The insulator 200 comprises the folded portion 240 to prevent shorting by ensuring that the stator coils 138 and the stator core 132 are not set too close to each other, when the insulator 200 shown in FIG. 10D is inserted into a slot 420. After the folded portion 240 is folded by 2~3 mm from the end surface of the stator core 132, a substantially S-shaped formation is created over the range corresponding to the length of the folded portion 240 at the insulator 200. When the stator coils 138 are inserted, the overlapping portions 210B and 210T of the insulator 200 function as positioning guides to prevent misalignment relative to the end surface of the stator core 132 along the axial direction and also disallow any shifting of the insulator 200 along the axial direction that might otherwise be caused by the stator coils 138 being inserted.

When folding the insulator 200 into the shape shown in FIGS. 9A-9G or FIGS. 10A-10D, it may be heated to 60~120° C. so as to shape the insulator 200 into the S-shaped formation, in which state the insulator 200 can be formed with better ease.

The insulator 200 having been folded into shape is inserted at a slot 420 in the stator core 132 and then the stator coils 138 are inserted. Since the stator coils 138 are each inserted into the void enclosed by the insulator 200, the insulating films at the coil surfaces of the stator coils 138 do not come into direct contact with the teeth or the core back at the stator core 132 and are protected from damage.

As described above, the insulator 200 that includes the overlapping portions 210B and 200T is always present between the stator coils 138 and the stator core 132, which makes it possible to prevent any damage or electrical grounding to the stator core 132 that might otherwise occur as the stator coils 138 and the stator core 132 came into direct -B-Shaped Insulator- FIG. 11 is an explanatory view illustrating another installation structure of the insulator mentioned above. The insulator is configured to be different from that described in reference to FIGS. 4, 5 and 6. FIG. 11 shows an insulator 200, folded differently from the insulator described in reference to FIGS. 4, 5 and 6, and inserted in each slot 420, with conductors having a substantially rectangular section inserted in the space formed with the inserted insulator 200. While an installation structure that may be adopted in conjunction with conductors with a substantially circular section disposed within the space formed with the insulator 200 has been described in reference to FIG. 6, the basic structural concept remains the same whether the section of the stator coils 138 is substantially circular or substantially rectangular and the following description focuses on an example in which the stator coils are constituted with conductors having a substantially rectangular section.

The features (I) and (II) of the installation structure of the insulator 200 as shown in FIG. 11 will be described as follows.

(I) A center portion C of the insulator 200 is positioned between the inner surface of the slot 420 and the two stator coils 138B and 138T disposed side by side along the radial direction so as to assure a high level of withstand voltage between the inner The insulator 200 comprising an inner side portion 200B and an outer side portion 200T is configured as shown FIG. 11. The center portion C of the insulator 200 starts from the center thereof and extends over the left side inner surface of the slot 420 in the figure. The inner side portion 200B of the insulator 200 circles around the outer circumference of one of the stator coils 138B located on the bottom side in the figure. An end side of the inner side portion 200B passes through an area 220 between the two stator coils and the end of the inner side portion 200B of the insulator 200 reaches the area between the one stator coil 138B and the center portion C of the insulator 200 to be held therebetween, thereby allowing the one stator coil 138B to be completely surrounded by the insulator 200.

In addition, the outer side portion 200T of the insulator 200 starts from the center thereof and circles around the outer circumference of the other stator coils 138T located on the top side in the figure. An end side of the outer side portion 200T passes through the area 220 between the two stator coils and the end of the outer side portion 200T of the insulator 200 reaches the area between the one stator coil 138T and the center portion C of the insulator 200 to be held therebetween, thereby allowing the other stator coil 138T to be completely surrounded by the insulator 200.

As noted above, the insulator 200 forms a substantially B shape as viewed in FIG. 11. However, it is to be noted that while the insulator assumes an inverted B formation when the section is viewed from the opposite direction, the technical concept remains the same. This structure assumed with regard to the insulator installation and the advantages achieved thereby constitute an essential feature.

(II) Another feature of the structure of the insulator 200 installed as shown in FIG. 11 will be explained. As noted above, the outer circumference of one of the stator coils 138B located on the bottom side in the figure is shielded with the inner side portion 200B of the insulator 200 and the inner side portion 200B forms an overlapping portion or gripped portion 210B at the end thereof, which overlaps the center portion C of the insulator 200. Whereas the outer circumference of the other stator coils 138T located on the top side in the figure is shielded with the outer side portion 200T of the insulator 200 and the outer side portion 200T forms an overlapping portion or gripped portion 210T at the end thereof, which overlaps the center portion C of the insulator 200.

Thanks to the overlapping portion 210B or the gripped portion, the end of the inner side portion 200B of the insulator 200 is firmly held between the stator coil 138B and the inner surface of the slot 420 together with the center portion C of the insulator 200. The end of the outer side portion 200T of the insulator 200 is firmly held between the stator coil 138T and the inner surface of the slot 420 together with the center portion C of the insulator 200.

According to this feature, following advantage can be realized. It is assured that the insulator 200 can be present between the stator coils 138B and 138T and the slot 420 even if the insulator 200 is subjected to a force as a stator coil 138 is inserted at the slot. Namely, since there is no area where the insulator 200 is absent and thus only the insulating film separates the conductor constituting a stator coil 138 from the stator core 132, a high level of withstand voltage can be sustained. In addition, since the insulator 200 is always present between the stator coils 138B and 138T, a high level of withstand voltage is also assured for the stator coils 138 B and 138T.

-Variation of B-Shaped Insulator-

FIGS. 12 and 13 each present an example of a variation of the structure of the insulator as shown in FIG. 11 adopted in conjunction with stator coils 138 having a rectangular section. In each variation, a greater number of stator coils are inserted in each slot. FIG. 12 shows a structure that includes two sets of stator coils disposed side-by-side along the radial direction, with each set of stator coils replicating the structure explained in reference to FIG. 11. FIG. 13, on the other hand, shows the variation of the structure with the stator coils 138 described in FIG. 11, each constituted with two conductors.

The basic structural features of the each insulator 200TT or 200BB and the advantages achieved through such an insulator have already been described in reference to FIG. 11. Even if a high-voltage is generated between the individual stator coils 138 in the structure shown in FIG. 12, each stator coil 138 is separated from the next stator coil via insulators 200 TT and 200BB and thus, a high level of withstand voltage is assured. This structure provides desirable surge voltage withstanding performance for an automotive rotating electric machine in which a high level of surge voltage tends to occur readily as the power conversion device is engaged in switching operation.

The structure shown in FIG. 13 is ideal when the variance in the voltages at stator coils 138 assuming a specific relationship is already known to be small. Namely, under such circumstances, a satisfactory level of insulation between the stator coils 138 assuming the specific relationship can be achieved with the insulating films at the individual stator coils 138. Accordingly, the stator coils 138 having the small voltage difference relative to each other are integrated as a set of two stator coils respectively enclosed by the same portions 200B and 200T of the insulator 200. The concept described in reference to FIG. 11 is then adopted in conjunction with the set of stator coils 138TS and 138BS, between which a significant difference in the potential exists.

The variation in FIG. 13 is more advantageous than that shown in FIG. 12 in that it requires less material and ensures better productivity. For instance, when a plurality of coil sets having coils 138 each assuming the same phase are present in a slot 420 at which four or more stator coils 138 are inserted, the stator coils 138 assuming the same phase can be integrated into a set so as to form each coil set 138TS or 138BS. The integrated coil set 138TS and 138BS of stator coils can be inserted in the common void formed with the insulator 200 respectively.

The features (I) and (II) of the installation structure of the insulator 200 as shown in FIGS. 12 and 13 are substantially identical to the explanation noted above with regard to FIG. 11. The features with regard to FIGS. 12 and 13 will be described separately as follows.

(I) In the rotating electric machine as shown in FIG. 12, a pair of insulators 200BB and 200TT are inserted in a single slot 420 and the respective insulators enclose the sets of stator coils 138TS and 138BS. The insulator 200BB is located at the inner side and the insulator 200TT is located at the outer side in FIG. 12. Center portions C of the insulators 200BB and 200TT are positioned between the stator coils 138 and the right (in FIG. 12) inner surface of the slot 420 so as to assure a high level of withstand voltage between the stator coils 138 and the stator core 132.

Following explanation as to FIG. 12 focuses on the inner side insulator 200BB, because an installation structure of the both insulator 200BB and 200TT is the same.

(II) One side portion of the inner side insulator 200BB starts from the center thereof and circles around the outer circumference of one of the stator coil 138 located on the inner side in the set of coils 138BS and one end portion of the inner side insulator 200BB extends through the area between the pair of stator coils 138 in the set of coils 138BS. The end of the inner side insulator 200BB contact the center portion C thereof. Thus the outer circumference of the one stator coil 138 located on the inner side in the figure becomes fully shielded with the insulator 200BB.

Another side portion of the inner side insulator 200BB starts from the center thereof and circles around the outer circumference of the other of the stator coil 138 located on the outer side in the set of coils 138BS and other end portion of the inner side insulator 200BB also extends through the area between the pair of stator coils 138 in the set of coils 138BS. The end of the inner side insulator 200BB contacts the center portion C thereof. Thus the outer circumference of the other stator coil 138 located on the outer side in the figure becomes fully shielded with the insulator 200BB.

As noted above, the insulator 200TT and 200BB form a substantially inverted B shape as viewed in FIG. 12. However, it is to be noted that while the insulator assumes a B formation when the section is viewed from the opposite direction, the technical concept remains the same.

(III) As noted above with regard to FIG. 12, the both end portions of the insulators 200BB are present over the area defined between a pair of stator coils 138 in the set of stator coils 138BS to be overlapped to each other and the both ends of the insulator 200BB abut on the center portion C of the insulator 200BB.

According to this feature, it is assured that thanks to the overlapping portion the insulator 200BB can be present between the stator coils 138 and the slot 420 even if the insulator 200BB is subjected to a force as a stator coil 138 is inserted at the slot 420. Namely, since there is no area where the insulator 200BB is absent and thus only the insulating film separates the conductor constituting a stator coil 138 from the stator core 132, a withstand voltage can be sustained. In addition, since the insulator 200BB is always present between the stator coils 138, a withstand voltage is also assured for the stator coils 138.

In particular, the both end portions of the insulators 200BB present over the area defined between a pair of stator coils 138 and constitutes a double layer of insulator. Accordingly, a high level of withstand voltage can be sustained.

(I) In the rotating electric machine as shown in FIG. 13, a single insulator 200 is inserted in a single slot 420 and the insulator 200 encloses two sets of coils 138TS and 138BS. The single insulator 200 circles around the outer circumference of the inner side coil group 138BS and the outer side coil group 138TS which are enclosed within the single insulator 200 inserted in a single slot 420. The center portion C of the insulator 200 is arranged between the coil groups 138BS, 138TS and the right inner surface of the slot 420. The insulators 200 form a substantially inverted B shape as viewed in FIG. 13.

By installing the insulator 200 as shown in FIG. 13, the center portion C of the insulator 200 is present between the sets of coil group 138BS, 138TS and the right inner surface of the slot 420, so that the withstand voltage of the stator coils 138BS, 138TS and inner surface of the slot 420 can be sustained.

(II) In FIG. 13, the end portions of the inner portion 200B and the outer portion 200T of the insulator 200 are overlapped each other at the area between the sets of coils 138BS and 138TS to form an overlapping portion 210 and the both ends of the inner and outer insulator 200TT and 200BB abut on the center portion of the insulator 200.

According to this feature, it is assured that the insulator 200 can be present between the sets of coils 138BS and 138TS even if the insulator 200 is subjected to a force as the stator coils 138 are inserted within the voids of the insulator 200. Namely, since there is no area where the insulator 200 is absent and thus only the insulating film separates the conductor constituting the sets of coils 138TS and 138BS from the stator core 132, a withstand voltage can be sustained. In addition, since the insulator 200 is always present between the sets of coils 138TS and 138BS, a withstand voltage is also assured for the sets of coils 138TS and 138BS.

In particular, the both end portions of the insulators 200 is present over the area defined between a pair of stator coils 138 and constitutes the double layer 210 of insulator. Accordingly, a high level of withstand voltage can be sustained.

In addition, in each of the structures illustrated in FIGS. 11~13, no overlapping portion 210 faces the slot opening 422 at the slot 420. By installing the insulator with no overlapping portion 210 set to face the slot opening 422 but instead all the overlapping portions 210 held between two stator coils 138, any shifting of the insulator 200 at the ends thereof can be prevented and thus, a high level of withstand voltage can be sustained.

-Manufacturing Method for B-Shaped Insulator-

FIGS. 14A-14F illustrate the manufacturing steps through which the insulator 200, to be inserted at the slot 420 with a substantially B-shaped formation as described in reference to FIGS. 11~13, is manufactured. As explained earlier, the ends of the insulator 200 are held between two stator coils 138. In addition, as illustrated in FIG. 11, when the insulator is inserted at the slot 420, overlapping portions 210 are formed. FIG. 14A shows the base material for an insulator 200 that is to be inserted in each slot 420 before it is folded into shape, FIG. 14B shows the base material with folding lines, along which the material is to be folded to form the insulator 200. The base material is folded as indicated in FIGS. 14C through 14E and as a result, the insulator 200 folded into the shape shown in FIG. 14E is created. FIG. 14F shows an enlargement of portion A in FIG. 14E. As described above, the end portions of the insulator 200 are held between the two stator coils 138, and the ends of the insulator 200 and the center portion C of the insulator 200 are held together between the stator coils 138 and the inner surface of the slot 420.

The folded insulator 200, formed as illustrated in FIGS. 14A-14F, is inserted at each slot 420 in the stator 130. Since the length of the insulator 200 measured along the rotational axis is greater than the length of the stator core 132 measured along the rotational axis, the insulator 200 inserted at each slot 420 projects out beyond the end of the stator core 132 along the axial direction, as FIG. 4 and FIG. 18, which is to be referred to later, clearly indicate. After the insulator 200 is inserted at each slot 420 in the stator 130, the stator coils 138 are inserted into the voids created by the insulator 200 inside the slot 420. The section of the conductors constituting the stator coils 138 inserted in the slot may be either substantially rectangular or substantially circular, as illustrated in FIGS. 5 and 6. Namely, the section of the conductors in FIGS. 11~13 may likewise be substantially rectangular or substantially circular.

In the insulator 200 manufactured as explained earlier in reference to FIGS. 10A~10D, a 2~3 mm folded portion 240 is formed on at least one side of the opening of the insulator 200 along the axial direction, i.e., at least on the top side in FIGS. 10A-10D. The insulator formed as illustrated in FIGS. 14A-14F may also include a similar folded portion 240. In such a case, when the insulator 200 is inserted into a slot 420, a 2~3 mm folded portion 240 projects out from the end surface of the stator core 132 in order to prevent shorting by ensuring that the stator coils 138 and the stator core 132 are not set too close to each other, as has been described in reference to FIGS. 10A-10D. When the stator coils 138 are inserted, the overlapping portions 210 of the insulator 200 function as positioning guides to prevent misalignment of the insulator relative to the end surface of the stator core 132 along the axial direction and also disallow any shifting of the insulator 200 along the axial direction that might otherwise be caused by the stator coils 138 being inserted.

When folding the insulator 200 into the required shape, it may be heated to 60~120° C. so as to shape the insulator 200 into the form of the substantially letter B, in which state the insulator 200 can be inserted at the slot 420, with better ease.

The insulator 200 having been folded into shape is inserted at a slot 420 in the stator core 132 and then the stator coils 138 are inserted. Since the stator coils 138 are each inserted into the void enclosed by the insulator 200, the insulating films at the coil surfaces of the stator coils 138 do not come into direct contact with the teeth or the core back at the stator core 132 and are protected from damage. As described above, the insulator 200 that includes the overlapping portions 210 is always present between the stator coils 138 and the stator core 132, which makes it possible to prevent any damage or electrical grounding that might otherwise occur as the stator coils 138 and the stator core 132 came into direct contact with each other.

-Variation B-Shaped Insulator-

Figure 15:
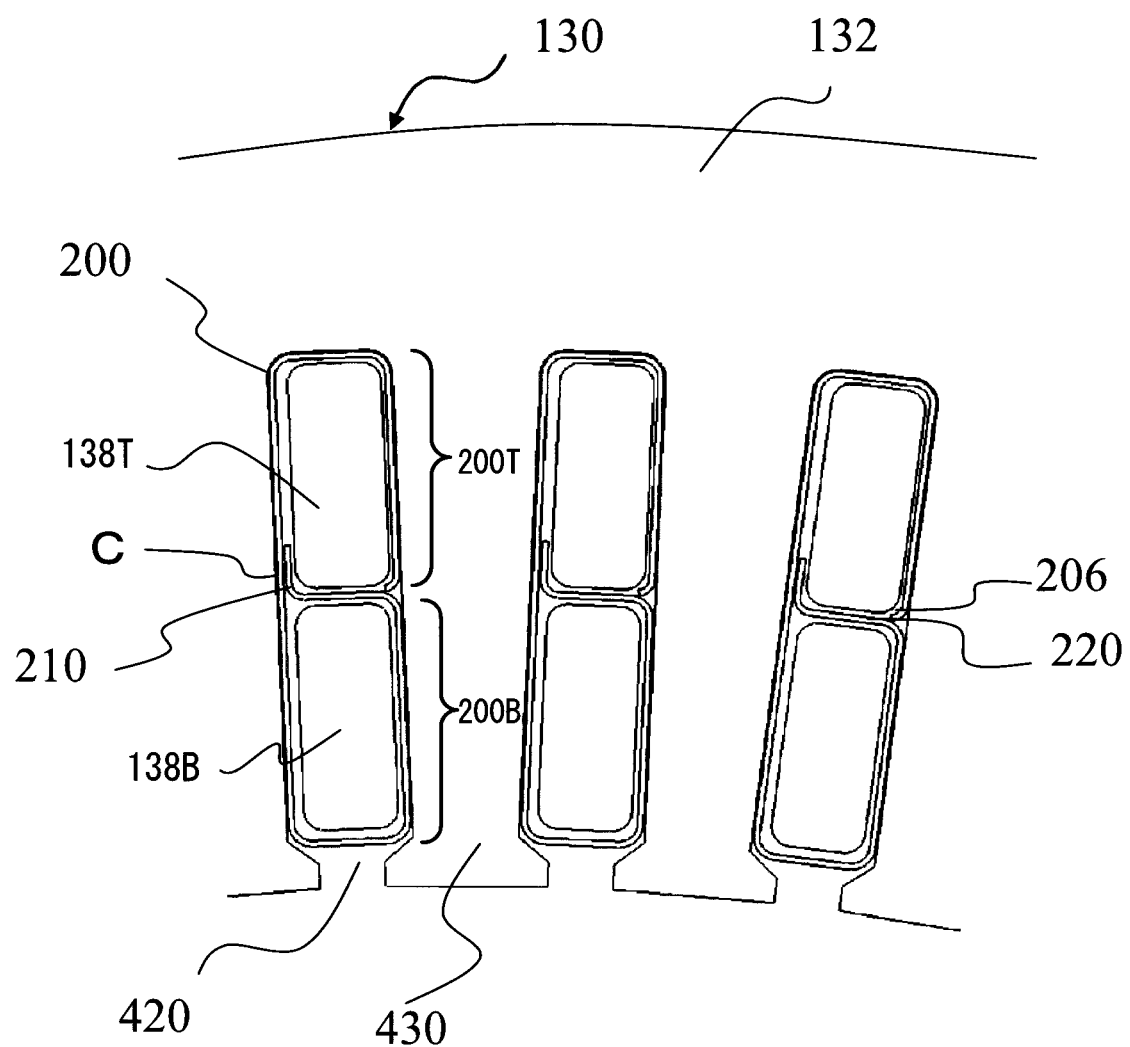
FIG. 15 is an explanatory view of yet another embodiment achieved as a variation of the structure shown in FIG. 11.

FIG. 15 is an explanatory view illustrating another installation structure of the insulator mentioned above. The insulator is configured to be different from that described in reference to FIGS. 4~10 and FIGS. 11~14 and form the shape of the number 6 which is a variation of the B shape. FIG. 15 shows an insulator 200 folded differently from the insulator described earlier and inserted in each slot 420, with conductors having a substantially rectangular section inserted in the space formed with the inserted insulator 200. While an installation structure that may be adopted in conjunction with conductors with a substantially circular section disposed within the space formed with the insulator 200 has been described in reference to FIG. 6, the basic structural concept remains the same whether the section of the stator coils 138 is substantially circular or substantially rectangular and the following description focuses on an example in which the stator coils are constituted with conductors having a substantially rectangular section.

(I) The insulator 200 comprises an inner side portion 200B and an outer side portion 200T. A center portion C of the insulator 200 extends over the left side inner surface of the slot 420. The center portion C of the insulator 200 is positioned between the inner surface of the slot 420 and the two stator coils 138B and 138T disposed side by side along the radial direction so as to assure a high level of withstand voltage between the inner surface of the slot 420 and the two stator coils 138. The insulator 200 forms a substantially B shape as viewed in FIG. 15.

(II) The inner side portion 200B of the insulator 200 extends from the center portion C of the insulator 200 and circles around the outer circumference of one of the stator coils 138B located on the inner side in the figure. An end side of the inner side portion 200B passes through an area between the two stator coils and runs upwardly along the corner of the outer side coil 138T. The end of the outer side insulator 200B is positioned to be held between the other stator coil 138T and the center portion C of the insulator 200. Accordingly, an overlap portion 210 is formed by the end of the inner side portion 200B of the insulator 200 and the center portion C of the insulator 200. This installation structure allows the one stator coil 138B to be completely surrounded by the insulator 200.

It is to be noted that the end of the inner side portion 200B of the insulator 200 may instead be held between the stator coil 138B and the center portion C of the insulator 200, as has been described in reference to FIG. 11.

In addition, the outer side portion 200T of the insulator 200 extends from the center portion C of the insulator 200 and circles around the outer circumference of the other stator coils 138T located on the outer side in the figure. The end of the outer side portion 200T of the insulator 200 is ended at the lower right corner of the other stator coil 138T. This structure allows the stator coil 138 located on this side to be completely surrounded by the insulator 200. It is to be noted that the other end of the outer side portion 200T of the insulator 200 may be extended to the area between the stator coils and held in the area between the stator coils.

Since the structure shown in FIG. 15 allows the two stator coils 138 to be each completely surrounded by the insulator 200, effects and advantages similar to those described in reference to FIGS. 11, 12 and 13 are achieved. The structure shown in FIG. 15 may be adopted in conjunction with a greater quantity of stator coils 138 disposed side-by-side in each slot 420 along the radial direction, as has been described in reference to FIGS. 12 and 13. Since the basic structural features are substantially identical to those explained in reference to FIGS. 12 and 13, a repeated explanation is not provided.

-Manufacturing Method for Variation B-Shaped Insulator-

FIGS. 16A-16H illustrate the manufacturing steps through which the insulator 200, to be inserted at the slot 420 in substantially the form of the number 6, i.e., a variation of the B-shaped formation described in reference to FIG. 15, is manufactured. As explained earlier, an overlapping portion 210 is formed at an end of the inner side portion 200B of the insulator 200 inserted in the slot 420. FIG. 16A shows the base material for an insulator 200, which is to be inserted in each slot 420, before it is folded into shape. FIG. 16B shows the material with folding lines, along which the material is to be folded to form the insulator 200. The base material is folded as indicated in FIGS. 16C, 16D and 16E and as a result, the insulator 200 folded into the shape shown in FIG. 16F is created. FIG. 16G shows an enlargement of the portion A in FIG. 16F.

As described earlier, the outer circumferences of the two stator coils 138 are reliably shielded with the insulator 200.

FIG. 16H presents a variation of the insulator shown in FIG. 16G and similar advantages are achieved by adopting the structure shown in FIG. 16H instead of that shown in FIG. 16G.

In addition, the end 206 of the outer side portion 200B of the insulator 200 may be slightly extended and held in the area between the two stator coils 138. The end 206 of the insulator 200 inserted in the area 220 between the stator coils is held in place more reliably and thus does not shift readily, assuring an improvement in the reliability.

Figure 17:
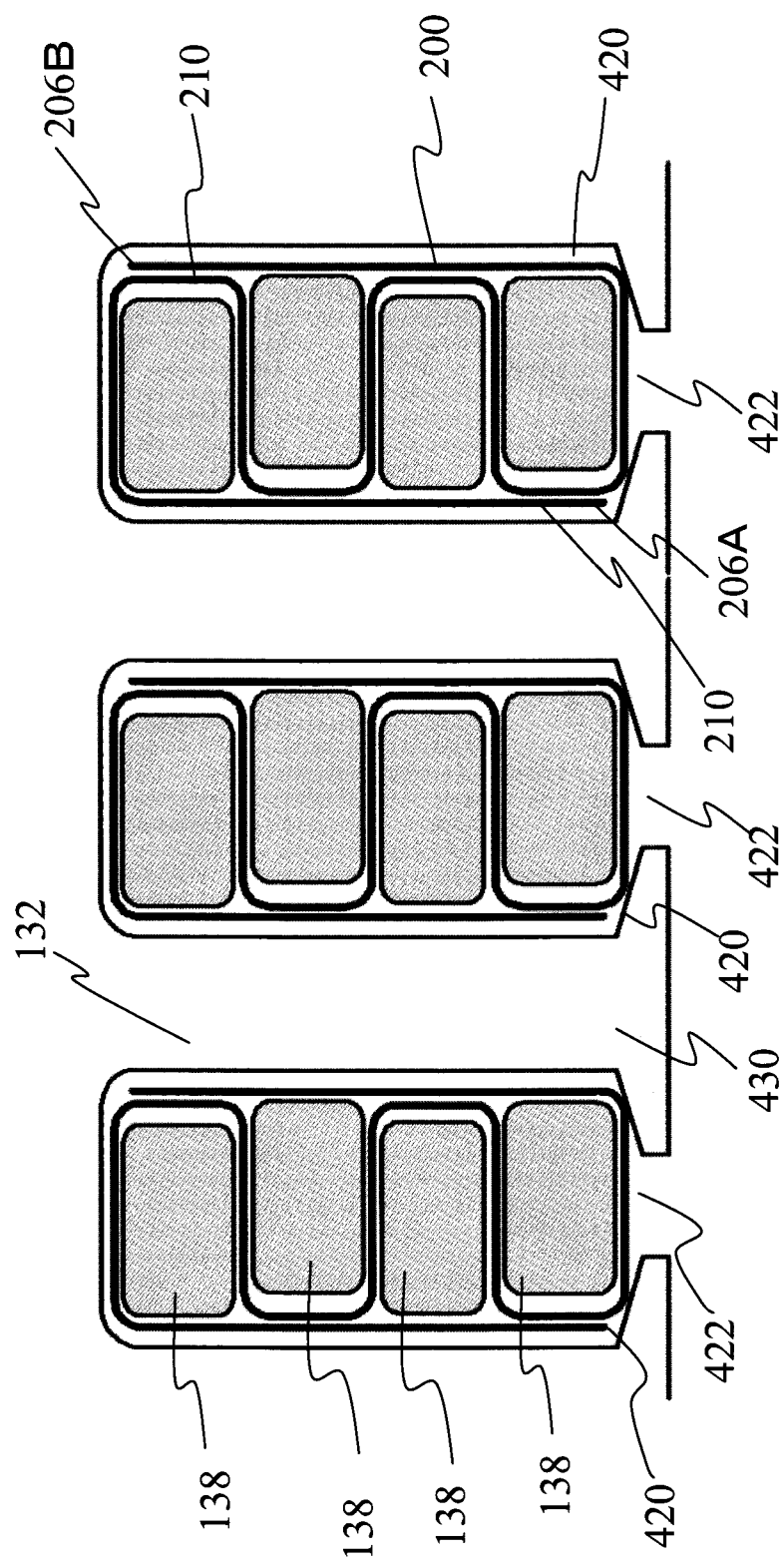
FIG. 17 is an explanatory view of an illustration of another embodiment.

FIG. 17 illustrates yet another structure that the insulator 200 may assume. One side of the insulator 200, which includes an end 206A of the insulator 200, is held between four stator coils 138 disposed side-by-side along the radial direction inside each slot 420 and the inner surface of the slot 420. The insulator 200 passes through the space between the individual stator coils 138, circles around the outer circumference of the stator coil 138 disposed closest to the slot opening 422. The insulator 200 further passes through the space between the inner surface of the slot 420 and the four stator coils 138 disposed side-by-side along the radial direction until its end 206B reaches the innermost side of the slot 420.

This structure allows each of the stator coils 138 disposed side-by-side along the radial direction to be completely surrounded by the insulator 200. Namely, the insulator 200 disposed in a wavy formation is held fast at the two ends thereof on outer sides of the wavy formation.

The two ends 206A and 206B of the insulator 200 are held fast between the stator coils 138 and the inner surfaces of the slot 420 with a high level of reliability and the insulator 200 is also held between the individual stator coils 138. Since the insulator does not shift readily, higher reliability is assured.

The insulator 200 folded into shape is first placed inside a slot 420 at the stator core 132 before the individual stator coils 138 are inserted. Since the stator coils 138 are each inserted into space enclosed by the insulator 200 without coming into direct contact with the teeth were the core back at the stator core 132, damage to the insulating films and the like at the coil services is prevented.

The structure described above, which assures seamless presence of the insulator between the stator coils 138 and the stator core 132 prevents damage and electrical grounding to the stator core 132 attributable to direct contact between the stator coils 138 and the stator core 132.

FIG. 18 is a partial enlargement of the coil end 140 at the stator 130, showing conductors 148 constituting the stator coils 138, inserted in the voids formed with the insulators 200 placed inside the slots 420, and folded along a diagonal direction to achieve electrical connection. The insulating films 144 formed at the surfaces of the stator coils 138 must be removed to achieve electrical connection. The film removal is executed before inserting the stator coils 138 in the spaces formed with the insulators 200. If a small spur or the like is left around a film removal end 146 or at a conductor 148 from which the insulating film has been removed, an insulator 200 may become damaged as stator coils 138 are inserted into the space formed with the insulator 200. It has been learned through experiment that the formation of such spurs or the like can be prevented by offsetting a film removal end 146A present at one surface of the conductor 140 and a film removal end 146B at the other surface of the conductor 148 relative to each other, as shown in FIG. 17.

As shown in FIG. 18, the section of the stator coils 138 covered with the insulating films 144 is substantially rectangular, with the corners of the rectangle either beveled or rounded. The corners of the sections of the stator coils 138 shown in FIGS. 5, 7, 8, 11~13 and 15, too, are beveled or rounded. By beveling or rounding the corners of the rectangular shape, the risk of damage to the insulators 200 is minimized as stator coils 138 are inserted into the space formed with the insulators 200. It is necessary to remove the insulating film 148 over the beveled or rounded corners of the rectangular shape in order to ensure that the insulating film 144 present on the surface of each stator coils 138 is reliably removed and thus, the surface of the conductor 148 must be removed through machining. This machining must be executed twice, i.e., once to etch one of the two surfaces facing opposite each other at the conductors 148 and another time to machine the other surface. By slightly offsetting the start points for the two machining operations relative to each other, the formation of spurs or the like, that would otherwise be formed readily around the film removal end 146A and the film removal end 146B, can be minimized.

The insulator 200 to be installed in each slot 420 can be formed by folding a single sheet of insulating material in each of the embodiments described above. As a result, an improvement in productivity is achieved.

The slots 420 formed at the stator 130 each include a slot opening 422 ranging along the rotational axis. The folded insulator 200 is first inserted into each slot 420 along the rotational axis and then stator coils 138 with insulating films 144 formed on the surfaces thereof are inserted along the rotational axis into the space formed by the folded insulator 200 and ranging along the axial direction. By adopting such a manufacturing method, damage to the insulating films 144 at the stator coils 138 that would otherwise occur readily as the stator coils 138 being inserted come into direct contact with the stator core 132, can be prevented. As a result, better reliability is assured.

In addition, since the electrical insulation between the inner surface of the slot 420 and the individual stator coils 138 is achieved via both the insulating films 144 formed at the surfaces of the stator coils 138 and the insulator 200, a high level of withstand voltage can be sustained.

Furthermore, since the insulator can be used in conjunction with stator coils 138 having a rectangular section, the space within the slot can be utilized with better efficiency. Thus, by adopting the technology described above in an automobile drive motor, a relatively compact motor capable of providing large output can be produced.

Each of the embodiments ascribed above allows a plurality of stator coils 138, e.g., four stator coils 138, set side-by-side along the radial direction perpendicular to the rotational axis in each slot, and each of the stator coils 138 can be electrically isolated from the stator core 132 via the insulator 200 structured as described earlier with good reliability to sustain desirable insulation characteristics.

Even though the insulating films 144 formed on the stator coils 138 are mechanically removed at the coil end 140, the structure shown in FIG. 17 prevents damage to the insulator 200 as the stator coils 138 are inserted into the slots, making it possible to improve productivity and reliability. In addition, since the insulating films 144 are removed with a high level of reliability, the reliability of the welded connections with the conductors 148 from which the insulating films 144 have been removed, improves.

What is claimed is:

1. A rotating electric machine comprising:
 a stator that includes a stator core with numerous slots formed therein and a stator coil disposed inside the slots at the stator core; and
 a rotor rotatably disposed inside the stator, wherein:
 the slots formed at the stator core each assume a section taken on a plane perpendicular to a rotational axis of the rotor, which is elongated along a radial direction;
 at least a first stator coil and a second stator coil together constituting the stator coil, and a thin insulator used to insulate the first stator coil and the second stator coil from the stator core, are disposed inside each slot;
 the first stator coil and the second stator coil are disposed side-by-side along the radial direction inside the slot;
 the insulator is disposed between an inner surface of the slot and the first and second stator coils disposed side-by-side along the radial direction;
 one side of the insulator extends along an outer circumference of the first stator coil so as to shield an outer circumferential surface of the first stator coil located on a side opposite from the second stator coil and further extends through an area between the first stator coil and the second stator coil, with an end of the insulator on the one side coming into contact with a portion of the insulator placed between the inner surface of the slot and the first and second stator coils;
 another side of the insulator extends along an outer circumference of the second stator coil so as to shield an outer circumferential surface of the second stator coil located on the side opposite from the first stator coil and further extends through the area between the first stator coil and the second stator coil, with an end of the insulator on the other side coming into contact with a portion of the insulator placed between the inner surface of the slot and the first and second stator coils;
 the insulator is made with one insulating sheet and is formed to have an overlapping portion that is disposed between the first and second stator coils; and
 the overlapping portion is structured so that the end of the insulator on the one side and the end of the insulator on the other side are overlapped between the first and second stator coils.

2. A rotating electric machine according to claim 1, wherein:
 the one side of the insulator extends along the outer circumference of the first stator coil so as to shield the outer circumferential surface of the first stator coil located on the side opposite from the second stator coil and further extends through the area between the first stator coil and the second stator coil, with the end of the insulator on the one side assuming a position between the outer circumference of the first stator coil and a center portion of the insulator; and the other side of the insulator extends along the outer circumference of the second stator coil so as to shield the outer circumferential surface of the second stator coil located on the side opposite from the first stator coil and further extends through the area between the first stator coil and the second stator coil, with the end of the insulator on the other side assuming a position between the outer circumference of the second stator coil and the center of the insulator.

3. A rotating electric machine according to claim 1, wherein:

a center portion of the insulator is set between the inner surface of the slot and the first and second stator coils disposed side-by-side along the radial direction;

the one side of the insulator extends along the outer circumference of the first stator coil so as to shield the outer circumferential surface of the first stator coil located on the side opposite from the second stator coil and further extends through the area between the first stator coil and the second stator coil, with the end of the insulator on the one side assuming a position between the outer circumference of the second stator coil and the center portion of the insulator; and the other side of the insulator extends along the outer circumference of the second stator coil so as to shield the outer circumferential surface of the second stator coil located on the side opposite from the first stator coil and the end of the insulator on the other side is in contact with the one side of the insulator.

4. A rotating electric machine according to claim 1, wherein:

the insulator disposed inside the slot projects out beyond an end of the stator core along the rotational axis.

5. A rotating electric machine according to claim 1, wherein:

the rotor includes a rotor core and a plurality of permanent magnets embedded in the rotor core for purposes of magnetic pole formation.

6. A rotating electric machine, comprising:

a stator that includes a stator core with numerous slots formed therein and a stator coil disposed inside the slots at the stator core; and a rotor rotatably disposed inside the stator, wherein:

the slots formed at the stator core each assume a section taken on a plane perpendicular to a rotational axis of the rotor, which is elongated along a radial direction;

at least a first stator coil and a second stator coil together constituting the stator coil, and a thin insulator used to insulate the first stator coil and the second stator coil from the stator core, are disposed inside each slot;

the first stator coil and the second stator coil are disposed side-by-side along the radial direction inside the slot;

the insulator is disposed between the first stator coil and the second stator coil disposed side-by-side along the radial direction;

one side of the insulator extends along an outer circumference of the first stator coil so as to shield an outer circumferential surface of the first stator coil located on a side opposite from the second stator coil, with an end of the insulator on the one side assuming a position between the first stator coil and the second stator coil;

another side of the insulator extends along an outer circumference of the second stator coil so as to shield an outer circumferential surface of the second stator coil located on the side opposite from the first stator coil, with an end of the insulator on the other side assuming a position between the first stator coil and the second stator coil;

the insulator is made with one insulating sheet and is formed to have a overlapping portion that is disposed between the first and second stator coils; and the overlapping portion is structured so that a portion of the insulator and the end of the insulator on the one side are overlapped between the first and second stator coils, and so that a portion of the insulator and the end of the insulator on the other side are overlapped between the first and second stator coils.

7. A rotating electric machine comprising:

a stator that includes a stator core with numerous slots formed therein and a stator coil disposed inside the slots at the stator core; and a rotor rotatably disposed inside the stator, wherein:

the slots formed at the stator core each assume a section taken on a plane perpendicular to a rotational axis of the rotor, which is elongated along a radial direction;

at least a first stator coil and a second stator coil together constituting the stator coil, and a thin insulator used to insulate the first stator coil and the second stator coil from the stator core, are disposed inside each slot;

the first stator coil and the second stator coil are disposed side-by-side along the radial direction inside the slot;

a center portion of the insulator is placed between the first stator coil and the second stator coil disposed side-by-side along the radial direction;

one side of the insulator extends along an outer circumference of the first stator coil so as to shield an outer circumferential surface of the first stator coil located on a side opposite from the second stator coil, with an end of the insulator on the one side assuming a position between the first stator coil and the center portion of the insulator;

another side of the insulator extends along an outer circumference of the second stator coil so as to shield an outer circumferential surface of the second stator coil located on the side opposite from the first stator coil, with an end of the insulator on the other side assuming a position between the second stator coil and the center portion of the insulator;

the insulator is made with one insulating sheet and is formed to have an overlapping portion that is disposed between the first and second stator coils; and the overlapping portion is structured so that the end of the insulator on the one side and the end of the insulator on the other side are respectively overlapped with the center portion of the insulator between the first and second stator coils.

8. A rotating electric machine according to claim 6, wherein:

the insulator disposed inside the slot projects out beyond an end of the stator core along the rotational axis.

9. A rotating electric machine according to claim 7, wherein:

the insulator disposed inside the slot projects out beyond an end of the stator core along the rotational axis.

10. A rotating electric machine according to claim 6, wherein:

the rotor includes a rotor core and a plurality of permanent magnets embedded in the rotor core for purposes of magnetic pole formation.

11. A rotating electric machine, comprising:
a stator that includes a stator core with numerous slots formed therein and a stator coil disposed inside the slots at the stator core; and
a rotor rotatably disposed inside the stator, wherein:
the slots formed at the stator core each assume a section taken on a plane perpendicular to a rotational axis of the rotor, which is elongated along a radial direction;
at least a first stator coil and a second stator coil together constituting the stator coil, and a thin insulator used to insulate the first stator coil and the second stator coil from the stator core, are disposed inside each slot;
the first stator coil and the second stator coil are disposed side-by-side along the radial direction inside the slot;
an end of the insulator on one side is set between an inner surface of the slot located on one side and the first and second stator coils disposed side-by-side along the radial direction; and the insulator extending from the end thereof on the one side circles around an outer circumference of the second stator coil disposed further inward within the slot, passes through an area between the first stator coil and the second stator coil, then circles around an outer circumference of the first stator coil disposed further toward an opening of the slot, with an end of the insulator on another side set between an inner surface of the slot located on another side and the first and second stator coils.

12. A rotating electric machine according to claim 7, wherein:
the rotor includes a rotor core and a plurality of permanent magnets embedded in the rotor core for purposes of magnetic pole formation.

* * * * *